United States Patent
Hishida et al.

(10) Patent No.: US 9,400,761 B2
(45) Date of Patent: Jul. 26, 2016

(54) MANAGEMENT METHOD FOR COMPUTER SYSTEM, COMPUTER SYSTEM, AND NON-TRANSITORY COMPUTER-READABLE STORAGE MEDIUM

(75) Inventors: Wakayuki Hishida, Tokyo (JP); Tomohito Uchida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 14/353,686

(22) PCT Filed: Jan. 19, 2012

(86) PCT No.: PCT/JP2012/051068
§ 371 (c)(1),
(2), (4) Date: Apr. 23, 2014

(87) PCT Pub. No.: WO2013/108386
PCT Pub. Date: Jul. 25, 2013

(65) Prior Publication Data
US 2015/0293868 A1    Oct. 15, 2015

(51) Int. Cl.
*G06F 13/38* (2006.01)
*G06F 13/12* (2006.01)
*G06F 11/20* (2006.01)

(52) U.S. Cl.
CPC .......... *G06F 13/385* (2013.01); *G06F 11/2028* (2013.01); *G06F 11/2092* (2013.01); *G06F 13/128* (2013.01)

(58) Field of Classification Search
CPC . G06F 13/385; G06F 13/128; G06F 11/2028; G06F 11/2092
See application file for complete search history.

(56) References Cited

U.S. PATENT DOCUMENTS

| 5,901,281 A | 5/1999 | Miyao et al. |
| 2008/0133963 A1 | 6/2008 | Katano et al. |

(Continued)

FOREIGN PATENT DOCUMENTS

| JP | 10-326202 A | 12/1998 |
| JP | 2004-355446 A | 12/2004 |

(Continued)

OTHER PUBLICATIONS

Japanese Office Action received in corresponding Japanese Application No. 2013-554155 dated Apr. 21, 2015.

(Continued)

*Primary Examiner* — Idriss N Alrobaye
*Assistant Examiner* — Ronald Modo
(74) *Attorney, Agent, or Firm* — Mattingly & Malur, PC

(57) ABSTRACT

A management system according to an example of the invention selects a standby combination candidate of an arrangement position candidate of a standby computer and an arrangement position candidate of a standby I/O adapter. The management system specifies a plurality of active combinations of an arrangement position of an active computer and an arrangement position of an active I/O adapter. The management system selects a switch method applicable between the standby combination candidate and each of the plurality of active combinations from a plurality of switch methods. The management system determines a priority of the selected switch method by referring to priority information associating each of the plurality of switch methods and the priority. The management system evaluates the standby combination candidate based on the determined priority of the selected switch method.

9 Claims, 30 Drawing Sheets

(56) References Cited

U.S. PATENT DOCUMENTS

| | | | |
|---|---|---|---|
| 2009/0138753 A1 | 5/2009 | Tameshige et al. | |
| 2010/0064165 A1 | 3/2010 | Kambara et al. | |
| 2010/0115049 A1 | 5/2010 | Matsunaga et al. | |
| 2010/0138686 A1* | 6/2010 | Arata | G06F 11/2025 714/4.1 |

FOREIGN PATENT DOCUMENTS

| | | |
|---|---|---|
| JP | 2008-140198 A | 6/2008 |
| JP | 2009-129148 A | 6/2009 |
| JP | 2010-067042 A | 3/2010 |
| JP | 2010-108409 A | 5/2010 |
| JP | 2010-128644 A | 6/2010 |

OTHER PUBLICATIONS

International Searching Authority, Written Opinion received in International Application No. PCT/JP2012/051068, Apr. 24, 2012, with English Translation of Box. V.

International Searching Authority, International Search Report received in International Application No. PCT/JP2012/051068, Apr. 24, 2012, with English Translation.

* cited by examiner

SERVER MANAGEMENT TABLE 215

| SERVER IDENTIFIER 601 | PROCESSOR CONFIGURATION 602 | MEMORY CAPACITY 603 | ADAPTER IDENTIFIER 604 | CONNECTED FC-SW PORT 605 | PRESENCE/ ABSENCE OF I/O SWITCH 606 | SERVER CONNECTED I/O PORT 607 | CHASSIS IDENTIFIER 608 |
|---|---|---|---|---|---|---|---|
| HOST1 | PROCESSOR1 1GHz | 2GB | HBA1 | FC-SW1, PORT0 | ABSENT | - | CHASSIS1 |
| HOST2 | PROCESSOR1 1GHz | 2GB | HBA2 | FC-SW1, PORT1 | ABSENT | - | CHASSIS1 |
| HOST3 | PROCESSOR1 1GHz | 2GB | HBA3 | FC-SW1, PORT2 | ABSENT | - | CHASSIS1 |
| HOST4 | PROCESSOR1 2GHz × 2 | 4GB | HBA4 | FC-SW1, PORT3 | PRESENT | IO-SW1, PORT3 | CHASSIS2 |
| HOST5 | PROCESSOR1 2GHz × 2 | 4GB | HBA5 | FC-SW1, PORT4 | PRESENT | IO-SW1, PORT4 | CHASSIS2 |

*FIG. 6*

SERVER SWITCH MANAGEMENT TABLE 216

| SERVER IDENTIFIER 701 | OPERATION FORM 702 | OPERATION IDENTIFIER 703 | SERVER STATE 704 |
|---|---|---|---|
| HOST1 | ACTIVE | TASK1 | NORMAL |
| HOST2 | ACTIVE | TASK2 | NORMAL |
| HOST3 | STANDBY | - | NORMAL |
| HOST4 | ACTIVE | TASK3 | NORMAL |
| HOST5 | ACTIVE | TASK3 | NORMAL |

SWITCH STRATEGY TABLE

| 801 | 802 | 803 | 804 | 805 |
|---|---|---|---|---|
| SWITCHING METHOD | SWITCH REQUIRED TIME | HBA TYPE | NECESSITY OF I/O SWITCH | PRIORITY |
| DEPLOY | 60MIN | HBA-A / HBA-B | UNNECESSARY | 1 |
| DISK MAPPING CHANGE | 15MIN | HBA-A | UNNECESSARY | 2 |
| WWN SWITCH | 25MIN | HBA-A / HBA-B | UNNECESSARY | 3 |
| ADAPTER INHERITANCE | 25MIN | HBA-A / HBA-B | NECESSARY | 4 |

*FIG. 8*

| SWITCH REQUIREMENT TABLE 218 ||||||
|---|---|---|---|---|---|
| 901 | 902 | 903 | 904 | 905 | 906 |
| OPERATION IDENTIFIER | MINIMUM NECESSARY PERFORMANCE (PROCESSOR) | MINIMUM NECESSARY PERFORMANCE (MEMORY) | RECOMMENDED PERFORMANCE (PROCESSOR) | RECOMMENDED PERFORMANCE (MEMORY) | ALLOWABLE SWITCHING TIME |
| TASK1 | 1GHz | 1GB | 2GHz | 4GB | - |
| TASK2 | 1GHz | 1GB | 2GHz | 2GB | 20MIN |
| TASK3 | 1GHz | 2GB | 2GHz | 4GB | 15MIN |

I/O SWITCH MANAGEMENT TABLE

| I/O SWITCH IDENTIFIER (1001) | I/O PORT (1002) | CONNECTED DEVICE (1003) | DEVICE IDENTIFIER (1004) | STATE (1005) |
|---|---|---|---|---|
| IO-SW1 | 0 | HBA | HBA4 | NORMAL |
| | 1 | HBA | HBA5 | NORMAL |
| | 2 | HBA | HBA6 | NORMAL |
| | 3 | HOST | HOST4 | NORMAL |
| | 4 | HOST | HOST5 | NORMAL |
| | 5 | UNASSIGNED | UNASSIGNED | - |
| | 6 | UNASSIGNED | UNASSIGNED | - |
| | 7 | UNASSIGNED | UNASSIGNED | - |

*FIG. 10*

FC SWITCH MANAGEMENT TABLE 220

| FC SWITCH IDENTIFIER (1101) | FC PORT (1102) | CONNECTED DEVICE (1103) | DEVICE IDENTIFIER (1104) | STATE (1105) |
|---|---|---|---|---|
| FC-SW1 | 0 | HBA | HBA1 | NORMAL |
| | 1 | HBA | HBA2 | NORMAL |
| | 2 | HBA | HBA3 | NORMAL |
| | 3 | HBA | HBA4 | NORMAL |
| | 4 | HBA | HBA5 | NORMAL |
| | 5 | HBA | HBA6 | NORMAL |
| | 6 | UNASSIGNED | UNASSIGNED | - |
| | 7 | UNASSIGNED | UNASSIGNED | - |
| | 8 | UNASSIGNED | UNASSIGNED | - |
| | 9 | UNASSIGNED | UNASSIGNED | - |
| | 10 | UNASSIGNED | UNASSIGNED | - |
| | 11 | UNASSIGNED | UNASSIGNED | - |
| | 12 | STORAGE | STORAGE1 | NORMAL |
| | 13 | STORAGE | STORAGE1 | NORMAL |
| | 14 | STORAGE | STORAGE1 | NORMAL |
| | 15 | STORAGE | STORAGE1 | NORMAL |

HBA MANAGEMENT TABLE

| 1201<br>ADAPTER IDENTIFIER | 1202<br>HBA TYPE | 1203<br>WWN | 1204<br>ASSIGNED DISK |
|---|---|---|---|
| HBA1 | HBA_A | 50.00.08.70.00.32.01.10 | VOL1 |
| HBA2 | HBA_B | 50.00.08.70.00.32.01.14 | VOL2 |
|  |  | 50.00.08.70.00.32.01.16 | - |
| HBA3 | HBA_B | 50.00.08.70.00.32.01.18 | - |
|  |  | 50.00.08.70.00.32.01.1A | - |
| HBA4 | HBA_B | 50.00.08.70.00.32.01.1C | VOL3 |
|  |  | 50.00.08.70.00.32.01.1E | - |
| HBA5 | HBA_B | 50.00.08.70.00.32.01.20 | VOL4 |
|  |  | 50.00.08.70.00.32.01.22 | - |
| HBA6 | HBA_B | 50.00.08.70.00.32.01.24 | - |
|  |  | 50.00.08.70.00.32.01.26 | - |

*FIG. 12*

| VOLUME MANAGEMENT TABLE 222 | | | | | |
|---|---|---|---|---|---|
| 1301 | 1302 | 1303 | 1304 | 1305 | 1306 |
| VOLUME IDENTIFIER | PORT IDENTIFIER | DOMAIN IDENTIFIER | BACKUP IMAGE | DUPLICATE VOLUME | WWN |
| VOL1 | 0 | 1 | Backup_host1 | STORAGE 1 VOL11 | 50.00.08.70.00.32.01.10 |
| VOL2 | 0 | 2 | Backup_host2 | STORAGE 1 VOL12 | 50.00.08.70.00.32.01.14 |
| VOL3 | 0 | 3 | Backup_host3 | – | 50.00.08.70.00.32.01.1C |
| VOL4 | 0 | 4 | – | – | 50.00.08.70.00.32.01.20 |
| VOL11 | 0 | 5 | – | – | – |
| VOL12 | 0 | 6 | – | – | – |

*FIG. 13*

CHASSIS MANAGEMENT TABLE 223

| CHASSIS IDENTIFIER (1401) | TYPE (1402) | SLOT NUMBER (1403) | DEVICE IDENTIFIER (1404) |
|---|---|---|---|
| CHASSIS1 | HOST | 0 | HOST1 |
| CHASSIS1 | HOST | 1 | — |
| CHASSIS1 | HOST | 2 | HOST2 |
| CHASSIS1 | HOST | 3 | HOST3 |
| CHASSIS1 | ADAPTER | 0 | HBA1 |
| CHASSIS1 | ADAPTER | 1 | — |
| CHASSIS1 | ADAPTER | 2 | HBA2 |
| CHASSIS1 | ADAPTER | 3 | HBA3 |
| CHASSIS2 | HOST | 0 | HOST4 |
| CHASSIS2 | HOST | 1 | — |
| CHASSIS2 | HOST | 2 | HOST5 |
| CHASSIS2 | HOST | 3 | — |

USER REQUEST STORAGE TABLE

| SWITCH GROUP IDENTIFIER (1601) | MINIMUM SCORE (1602) | MAXIMUM SCORE (1603) | AVERAGE SCORE (1604) |
|---|---|---|---|
| Gr1 | 2 | 4 | 3 |
| Gr2 | 1 | 3 | 2 |
| Gr3 | 3 | 4 | 3 |

FIG. 16

UNUSED DEVICE MANAGEMENT TABLE 213

| TYPE | SERVER IDENTIFIER/ADAPTER IDENTIFIER 1902 | CHASSIS IDENTIFIER/I/O SWITCH IDENTIFIER 1903 | SLOT NUMBER/PORT NUMBER 1904 | |
|---|---|---|---|---|
| HOST | HOST3 | CHASSIS1 | SLOT3 | 1911 |
| ADAPTER | HBA3 | CHASSIS1 | SLOT3 | |
| ADAPTER | HBA6 | I/O-SW1 | PORT2 | |
| HOST | HOST6 | CHASSIS1 | SLOT1 | 1912 |
| HOST | HOST7 | CHASSIS2 | SLOT1 | |
| HOST | HOST8 | CHASSIS2 | SLOT3 | |
| ADAPTER | HBA7 | CHASSIS1 | SLOT1 | |
| ADAPTER | HBA8 | I/O-SW1 | PORT5 | |
| ADAPTER | HBA9 | I/O-SW1 | PORT6 | |
| ADAPTER | HBA10 | I/O-SW1 | PORT7 | |

(1901 = TYPE column)

*FIG. 19*

| | 212 |||||
|---|---|---|---|---|---|
| | STANDBY SERVER CANDIDATE TABLE |||||
| | 2001 | 2002 | 2003 | 2004 | 2005 |
| | SERVER IDENTIFIER | ADAPTER IDENTIFIER | MINIMUM SCORE | MAXIMUM SCORE | TOTAL SCORE |
| | HOST3 | HBA3 | 3 | 3 | 12 |
| | HOST3 | HBA6 | – | – | – |
| | HOST3 | HBA7 | – | – | – |
| | HOST3 | HBA8 | – | – | – |
| | HOST3 | HBA9 | – | – | – |
| | HOST3 | HBA10 | – | – | – |
| | HOST6 | HBA3 | – | – | – |
| | HOST6 | HBA6 | – | – | – |
| | HOST6 | HBA7 | 3 | 3 | 12 |
| | HOST6 | HBA8 | – | – | – |
| | HOST6 | HBA9 | – | – | – |
| | HOST6 | HBA10 | – | – | – |
| | HOST7 | HBA3 | – | – | – |
| | HOST7 | HBA6 | 3 | 4 | 14 |
| | HOST7 | HBA7 | – | – | – |
| | HOST7 | HBA8 | 3 | 4 | 14 |
| | HOST7 | HBA9 | 3 | 4 | 14 |
| | HOST7 | HBA10 | 3 | 4 | 14 |
| | HOST8 | HBA3 | – | – | – |
| | HOST8 | HBA6 | 3 | 4 | 14 |
| | HOST8 | HBA7 | – | – | – |
| | HOST8 | HBA8 | 3 | 4 | 14 |
| | HOST8 | HBA9 | 3 | 4 | 14 |
| | HOST8 | HBA10 | 3 | 4 | 14 |

FIG. 20

| RECOMMENDED STANDBY SERVER ARRANGEMENT POSITION | RECOMMENDED STANDBY HBA ARRANGEMENT POSITION | MINIMUM SCORE | MAXIMUM SCORE | AVERAGE SCORE |
|---|---|---|---|---|
| CHASSIS2, SLOT1 | I/O-SW1, PORT2 | 3 | 4 | 14 |
| CHASSIS2, SLOT3 | I/O-SW1, PORT5 | 3 | 4 | 14 |

*FIG. 23*

MANAGEMENT METHOD FOR COMPUTER SYSTEM, COMPUTER SYSTEM, AND NON-TRANSITORY COMPUTER-READABLE STORAGE MEDIUM

BACKGROUND

The present invention relates to a computer system management method, a computer system and a storage medium and particularly to the management of standby computers in a computer system.

A conventional computer system includes, for example, server computers and a storage system for providing volumes to the server computers, and the server computer accesses the storage system via an I/O (Input/Output) device arranged in the same chassis and directly connected to the server computer by wiring in the chassis.

If a failure occurs in an active server computer or an active I/O adapter, the computer system switches a combination of the active server computer and the active I/O adapter in which the failure has occurred to a combination of a standby server computer and a standby I/O adapter. The computer system switches a path of the I/O adapter and the storage system from the one of the active I/O adapter to the one of the standby I/O adapter.

In another example of a conventional computer system, only an active server computer is switched to a standby server computer and an active I/O adapter is continually used by switching a path to the active I/O adapter to the one from another standby server computer in failure recovery in the event of a failure in the active server computer in a configuration in which the server computer and the I/O adapter are connected by a network.

A management computer disclosed in Patent Literature 1 causes a standby server computer to take over a task by switching a path to a storage system from the one from an active server computer to the one from a standby server computer when a failure occurs in the active server computer. The management computer refers to a switch strategy table associating device information and switch methods in the server computers and selects a switch strategy according to devices including the active server computers and the standby server computers.

Patent Literature 1: JP2010-128644A

SUMMARY

In the above conventional technology, if a failure occurs in the active server computer or the active I/O adapter, an appropriate server computer is selected from already arranged standby server computers and the active server computer is switched to the selected standby server computer. Thus, there is a possibility that resources in the system cannot be effectively utilized if the arrangement of the standby server computer in the system is not appropriate.

An aspect of the present invention is management method for a computer system including a plurality of computers and a plurality of I/O adapters by a management system. The management system selects a standby combination candidate of an arrangement position candidate of a standby computer and that of a standby I/O adapter. The management system specifies a plurality of active combinations of an arrangement position of an active computer and that of an active I/O adapter. The management system selects a switch method applicable between the standby combination candidate and each of the plurality of active combinations from a plurality of switch methods. The management system determines a priority of the selected switch method by referring to priority information associating each of the plurality of switch methods and the priority. The management system evaluates the standby combination candidate based on the determined priority of the selected switch method.

According to one aspect of the present invention, an appropriate arrangement position of a standby computer according to an active system configuration can be determined in a computer system.

BRIEF DESCRIPTION OF DRAWINGS

FIG. 6 is a diagram showing a configuration example of a server management table of the embodiment, FIG. 7 is a diagram showing a configuration example of a server switch management table of the embodiment, FIG. 8 is a diagram showing a configuration example of a switch strategy table of the embodiment, FIG. 9 is a diagram showing a configuration example of a switch requirement table of the embodiment, FIG. 10 is a diagram showing a configuration example of an I/O switch management table of the embodiment, FIG. 11 is a diagram showing a configuration example of a fiber channel switch management table of the embodiment, FIG. 12 is a diagram showing a configuration example of a host bus adapter management table of the embodiment, FIG. 13 is a diagram showing a configuration example of a volume management table of the embodiment, FIG. 14 is a diagram showing a configuration example of a chassis management table of the embodiment, FIG. 16 is a diagram showing a configuration example of a user request storage table of the embodiment, FIG. 19 is a diagram showing a configuration example of an unused apparatus management table of the embodiment, FIG. 20 is a diagram showing a configuration example of a standby server candidate table of the embodiment, FIG. 23 is a display example of recommended arrangement positions of standby server computers and standby host bus adapters in the embodiment.

DESCRIPTION OF EMBODIMENTS

Hereinafter, an embodiment of the present invention is described with reference to the drawings. To clarify the description, the following description and the drawings are partly omitted and simplified as appropriate. A computer system of the present embodiment includes a management computer, a plurality of computers and a plurality of I/O (Input/Output) adapters. The computer is connected to a network via the I/O adapter assigned thereto and accesses a storage system, for example, via a data communication network.

The management system of the present embodiment evaluates a new arrangement position of a standby computer in the computer system. Specifically, the management system selects a combination candidate of a position where the standby computer can be arranged in the system and an arrangement position of a standby I/O adapter assignable to that standby computer, and specifies a switch method applicable for a switch from each of a plurality of active computers in the system to the standby computer. The management system evaluates the combination candidate of the above arrangement based on the specified switch method from each active computer.

By evaluating a candidate for the arrangement positions of the standby computer and the standby I/O adapter for the switch from the plurality of computers of the active system in this way, it is possible to select a more appropriate actual arrangement position of the standby computer corresponding to the configuration of the active system.

Figure 1:
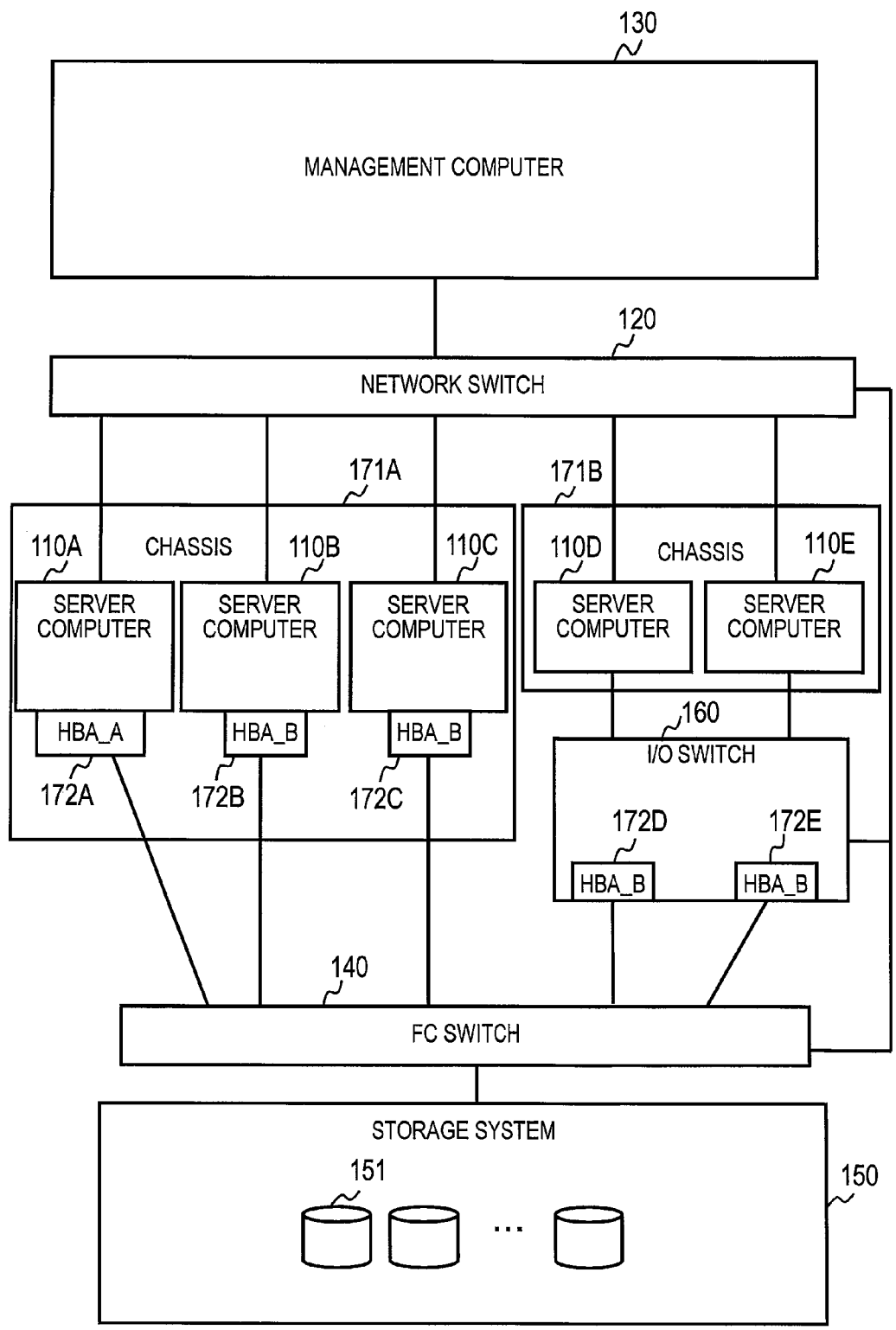
FIG. 1 is a diagram schematically showing a configuration example of a computer system of an embodiment.

FIG. 1 is a block diagram schematically showing a configuration example of the computer system of the present embodiment. The computer system includes a plurality of task server computers (also referred to as servers or server computers) 110A to 110E, a network switch 120, a management computer 130, a fiber channel switch (FC switch) 140, a storage system 150 and an I/O switch 160. In the computer system of the present embodiment, the number of apparatuses changes depending on a design.

Each of the server computers 110A to 110C is an active server computer or a standby server computer. The active server computer is a computer performing a task and the standby server computer is a server computer on standby which is performing no task and can take over a task from the active server computer.

The server computers 110A to 110C are housed in slots in a chassis 171A. The chassis 171A houses HBAs (Host Bus Adapters) 172A to 172C in the slots. The chassis 171A includes a chassis controller (not shown) for managing and controlling the housed apparatuses.

The HBA is an I/O adapter for the server computer and an interface for performing protocol conversion to connect the computer to a network. In this configuration example, the HBA is a communication interface card for connection to an FC network. The HBAs 172A to 172C are respectively connected to the server computers 110A to 110C by wiring in the chassis 171A. The server computers 110A to 110C are respectively connected to the FC switch 140 via the HBAs 172A to 172C. The type of the HBA 172A is HBA_A and that of the other HBAs 172B and 172C are HBA_B.

The server computers 110D, 110E are respectively housed in slots of a chassis 171B different from the chassis 171A. The chassis 171B includes a chassis controller (not shown) for managing and controlling the housed apparatuses.

The I/O switch 160 is, for example, a PCIe switch. The I/O switch 160 includes HBAs 172D, 172E, the type of which is HBA_B. The I/O switch 160 can select the HBAs to be assigned to the server computers 110D, 110E from the HBAs 172D, 172E and switch them. The server computers 110D, 110E are respectively connected to the FC switch 140 via one or the other of the HBAs 172D, 172E.

The network including the network switch 120 is a management network, and the management computer 130 is connected to the other apparatuses, i.e. the server computers 110A to 110E, the FC switch 140, the storage system 150 and the I/O switch 160 via the network switch 120. The management computer 130 transmits and receives data necessary to manage each apparatus via the network switch 120. Typically, the management network is an IP network, but another protocol may be used.

The network including the FC switch 140 is a network for communication of data to be stored in the storage system 150 and, in this configuration, an SAN (Storage Area Network). In this example, the SAN utilizes a fiber channel. The SAN can include a plurality of fiber channel switches.

This network for data communication may utilize a protocol different from the fiber channel provided that it is a network for data communication, and may be a network other than the SAN such as iSCSI (Internet Small Computer System Interface) network or an IP network.

The storage system 150 provides volumes 151 to the server computers 110A to 110E. Each server computer 110A to 110E is connected to the FC switch 140 by the HBA assigned thereto and accesses the volumes of the storage system 150 via the FC switch 140.

Figure 2:
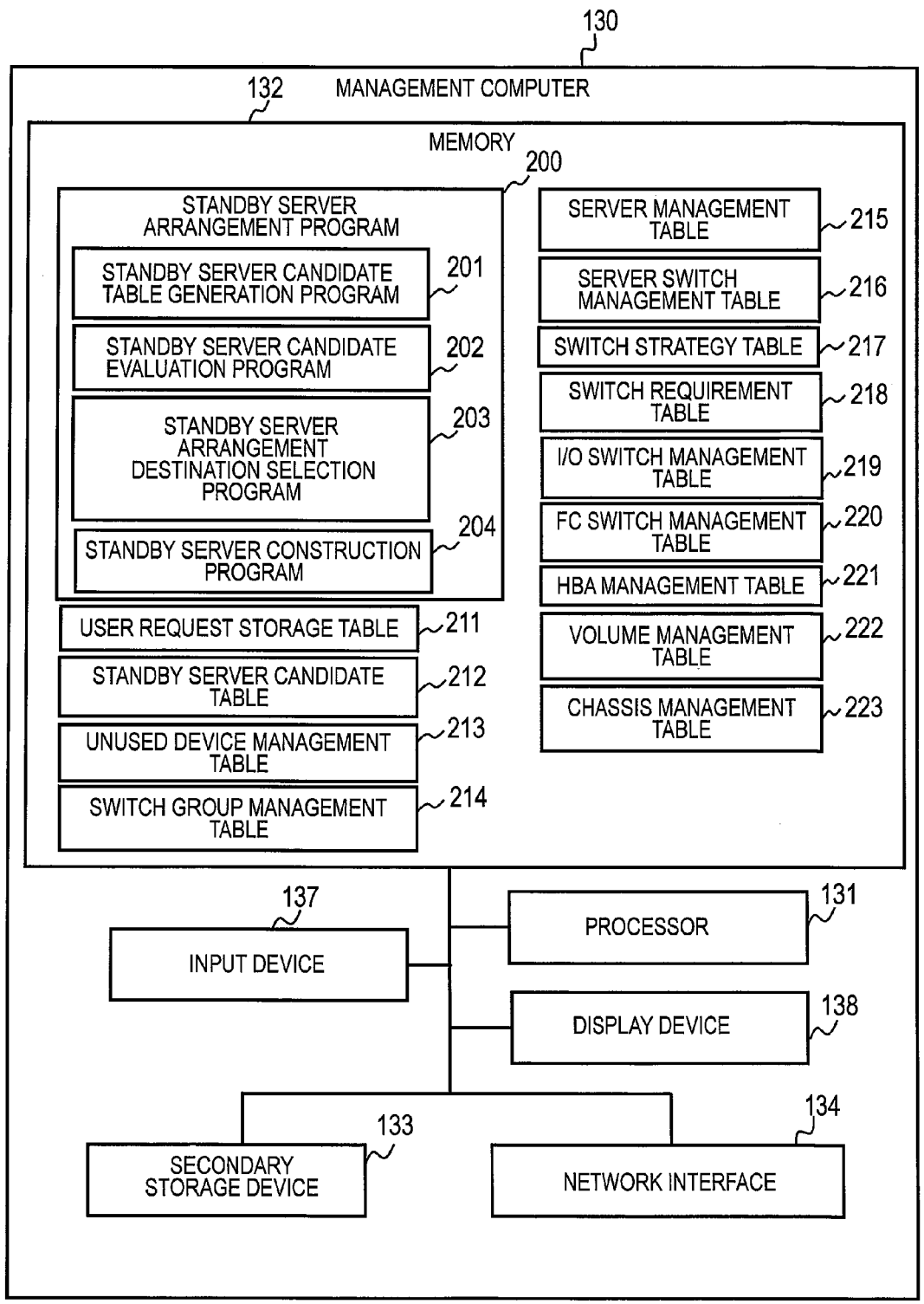
FIG. 2 is a diagram schematically showing a configuration example of a management computer of the embodiment.

FIG. 2 is a block diagram schematically showing hardware configuration and software configuration examples of the management computer 130. The management computer 130 includes a processor 131, a memory 132 as a main storage apparatus, a secondary storage apparatus 133, a network interface 134, an input apparatus 137 and a display apparatus 138. These are connected via a bus.

The management computer 130 is connected to the network switch 120 via the network interface 134 and carries out communication with the other apparatuses in the system. An administrator (user) enters and confirms necessary information using the input apparatus 137 and the display apparatus 138. The input apparatus 137 typically includes a mouse and a keyboard, and a typical example of the display apparatus is a liquid crystal display apparatus.

Although the management computer 130 including the input and output apparatuses 137, 138 is illustrated in FIG. 2, the administrator may utilize functions of the management computer 130 from another terminal via the network. Although the management system of this example comprises the management computer 130, the management system may comprise a plurality of computers. One of the plurality of computers may be a computer for display and the plurality of computers may realize a processing equivalent to that of the management computer to make a management processing faster and more reliable.

The processor 131 realizes a predetermined function of the management computer 130 by executing a program stored in the memory 132. Specifically, the management computer 130 stores a standby server arrangement program 200 in addition to an unillustrated OS (Operating System). The standby server arrangement program 200 includes a standby server candidate table generation program 201, a standby server candidate evaluation program 202, a standby server arrangement destination selection program 203 and a standby server construction program 204. The number of the programs depends on a design. These programs are described in detail later.

The memory 132 further stores information to be utilized by the standby server arrangement program 200. Specifically, the memory 132 stores a user request management table 211, a standby server candidate table 212, an unused apparatus management table 213, a switch group management table 214, a server management table 215, a server switch management table 216, a switch strategy table 217, a switch requirement table 218, an I/O switch management table 219, an FC switch management table 220, an HBA management table 221, a volume management table 222 and a chassis management table 223. These are described in detail later.

In this configuration example, information used for system management is stored in the tables. The number of the tables including necessary information and information stored in each table depend on a system design. In the present embodiment, information stored in a data storage area does not depend on a data structure and may be represented in any data structure. For example, tables, lists or database can indicate information. This point holds true also for the other apparatuses.

The processor 131 operates as functional parts (e.g. standby server candidate table generator or standby server candidate evaluator) for realizing these functions by operating in accordance with the above programs. Accordingly, processings performed by the programs are processings of the processor 131 and the management computer 130 including the processor 131.

Although the programs and information are shown in the memory 132 for the sake of convenience in FIG. 2, data (including programs) necessary in the processing of the management computer 130 is typically loaded from the secondary storage apparatus 133 to the memory 132. The secondary storage apparatus 133 may be connected to the memory 132 via the network. The description of these processor and storage apparatus is similar for the other apparatuses.

Figure 3:
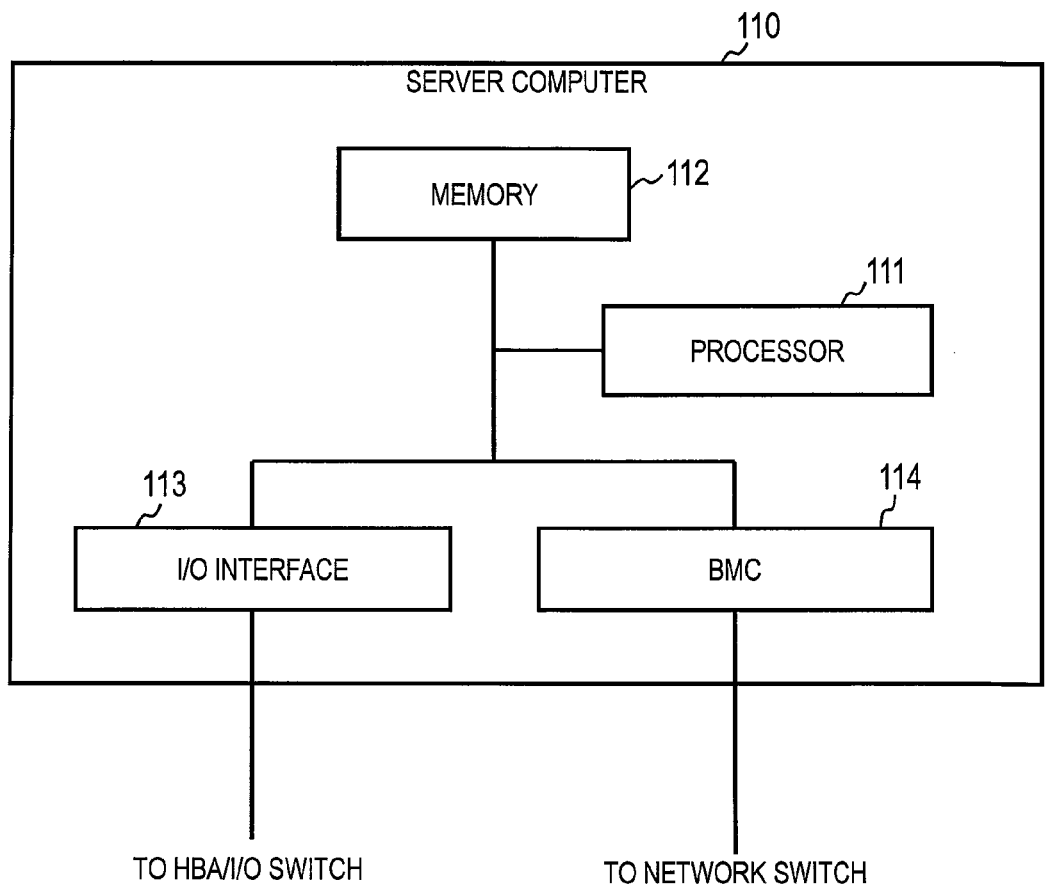
FIG. 3 is a diagram schematically showing a configuration example of a server computer of the embodiment.

FIG. 3 is a block diagram schematically showing the hardware configuration of the server computers 110A to 110E. Here, the server computers 110A to 110E are collectively referred to as server computers 110. The server computers 110 have a similar basic hardware configuration. The server computer 110 includes a processor 111, a memory 112 as a main storage apparatus, an I/O interface 113, a BMC (Baseboard Management Controller) 114.

Although not shown, the memory 112 stores information to be referred to by the OS, application programs (task programs) and programs, and the processor 111 operates according to these programs. The server computer 110 is connected to the HBA or the I/O switch 160 via the I/O interface 113. In the configuration example of this computer system, data stored in the memory 112 is loaded from the storage system 150.

The BMC 114 functions as an interface for connecting the server computer 110 to the network switch 120. Further, the BMC 114 is a controller for managing the server computer 110 and, in the server computer 110, monitors a hardware error and notifies it to the OS of the server computer 110 and the chassis controller (not shown) of the chassis in which the server computer 110 is arranged. The chassis controller transmits that error notification to the management computer 130.

The I/O switch 160 shown in FIG. 1 includes a switch control mechanism (not shown) and a plurality of HBAs. In the example of FIG. 1, two HBAs 172D, 172E are incorporated. The switch control mechanism controls the connection (combination) of the server computer and the HBA. The switch control mechanism connects the server computer and the HBA assigned to that server computer. In communication between the server computer and the storage system 150, the switch control mechanism transfers data to the server computer and the storage system 150 via the HBA assigned to that server computer.

Figure 4:
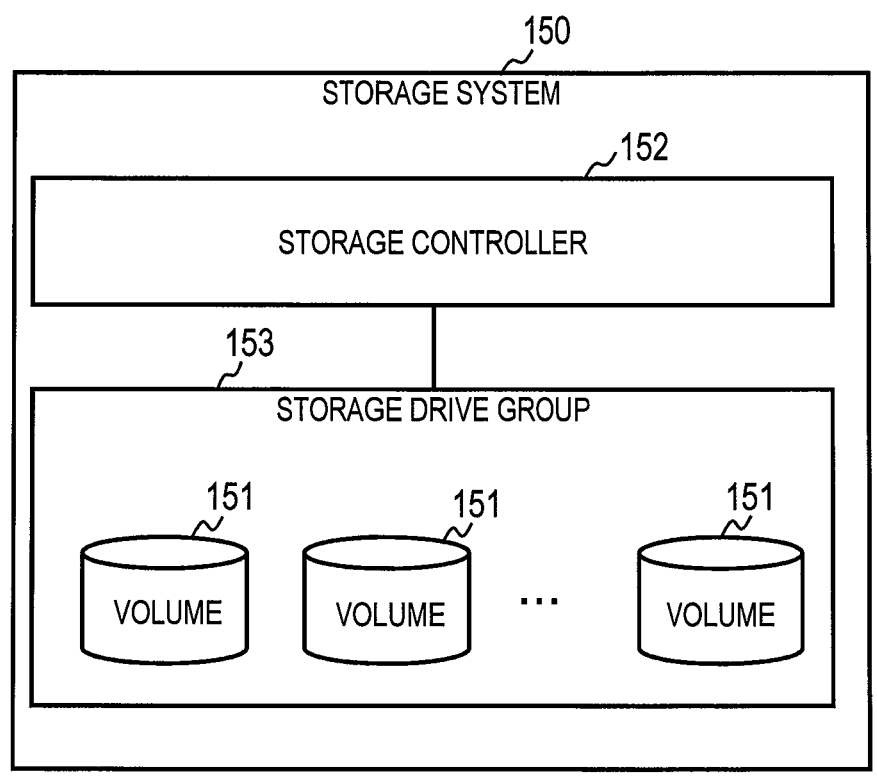
FIG. 4 is a diagram schematically showing a configuration example of a storage system of the embodiment.

FIG. 4 is a block diagram showing a configuration example of the storage system 150. The storage system 150 includes a storage controller 152 and a storage drive group 153. The storage drive group 153 includes one or a plurality of types of storage drives. Examples of the storage drive include an SSD (Solid State Drive) and an HDD (Serial Attached SCSI Hard Disk Drive).

The volume is a logical storage area and associated with storage areas of one or a plurality of storage drives in the storage drive group 153. Typically, a RAID (Redundant Arrays of Inexpensive Disks) comprising a plurality of storage drives provides a plurality of volumes 151. The storage controller 152 controls the operation of the storage system 150 for the generation, duplication, management and access control of the volumes.

Server computer switch methods are described with reference to FIGS. 5A to 5C. One active HBA is assigned to one active server computer, and the active server computer uses the same active HBA assigned thereto for data communication with the storage system 150 unless a failure occurs or a switch is instructed by the administrator.

The computer system switches the active server computer to the standby server computer such as if a failure occurs in the active server computer, if a failure occurs in the HBA connected to the active server computer or if an instruction is given from the administrator for maintenance. Further, in a switch from the active server computer to the standby server computer, the system switches the active HBA to the standby HBA if necessary.

This computer system switches from the active server computer to the standby server computer by one switch method selected from four switch methods. These four methods are described below with reference to FIGS. 5A to 5C. These four methods are respectively referred to as an adapter inheritance method, a WWN (World Wide Name) switch method, a mapping change method and a deploy method. The management computer 130 evaluates arrangement position candidates (arrangement destination candidates) of the standby server computer and the standby HBA based on these four switch methods. This point will be described later.

Figure 5A:
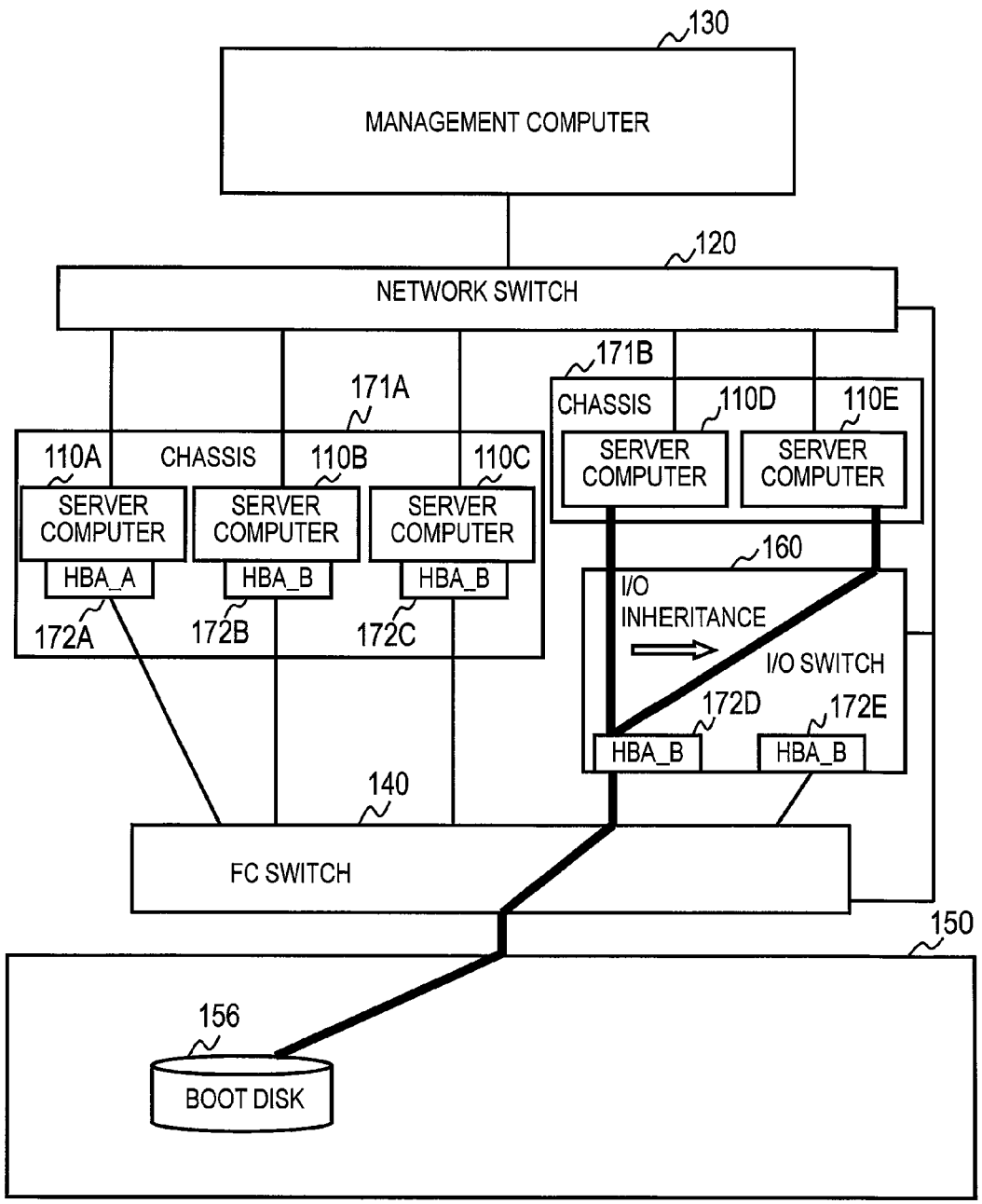
FIG. 5A is a diagram showing a server computer switch method in the embodiment.

FIG. 5A is a diagram showing the adapter inheritance method. In an example of FIG. 5A, the server computer 110D is the active server computer in which a failure has occurred and a switch origin server computer. The server computer 110E is a switch destination standby server computer. The active HBA 172D is assigned to the active server computer 110D, and the active server computer 110D accesses a volume 156 of a boot disk via the active HBA 172D.

In the adapter inheritance method, the HBA 172D used by the switch origin server computer 110D is assigned to the switch destination standby server computer 110E. In this way, the switch destination server computer 110E takes over the HBA 172D used by the switch origin server computer 110D. That is, the server computer assigned to the active HBA 172D is switched from the failed server computer 110D to the standby server computer 110E in the adapter inheritance method. In this way, a switch is made from a switch origin combination of the switch origin server computer 110D and the switch origin HBA 172D to a switch destination combination of the switch destination server computer 110E and the switch destination HBA 172D.

Specifically, the management computer 130 instructs the I/O switch 160 to switch the apparatus assigned to the HBA 172D from the server computer 110D to the server computer 110E. A control management mechanism of the I/O switch 160 switches the apparatus assigned to the HBA 172D from the server computer 110D to the server computer 110E in control information and, thereafter, transfers data between the server computer 110E and the volume 156 of the storage system 150 via the HBA 172D.

The adapter inheritance method switches a connection destination server computer of the active HBA 172D by the I/O switch 160. In this example, the adapter inheritance method can be used between the server computers connected to the I/O switch 160 (server computers 110D, 110E in this example). Further, the adapter inheritance method requires that no failure is occurring in the active HBA 172D.

Figure 5B:
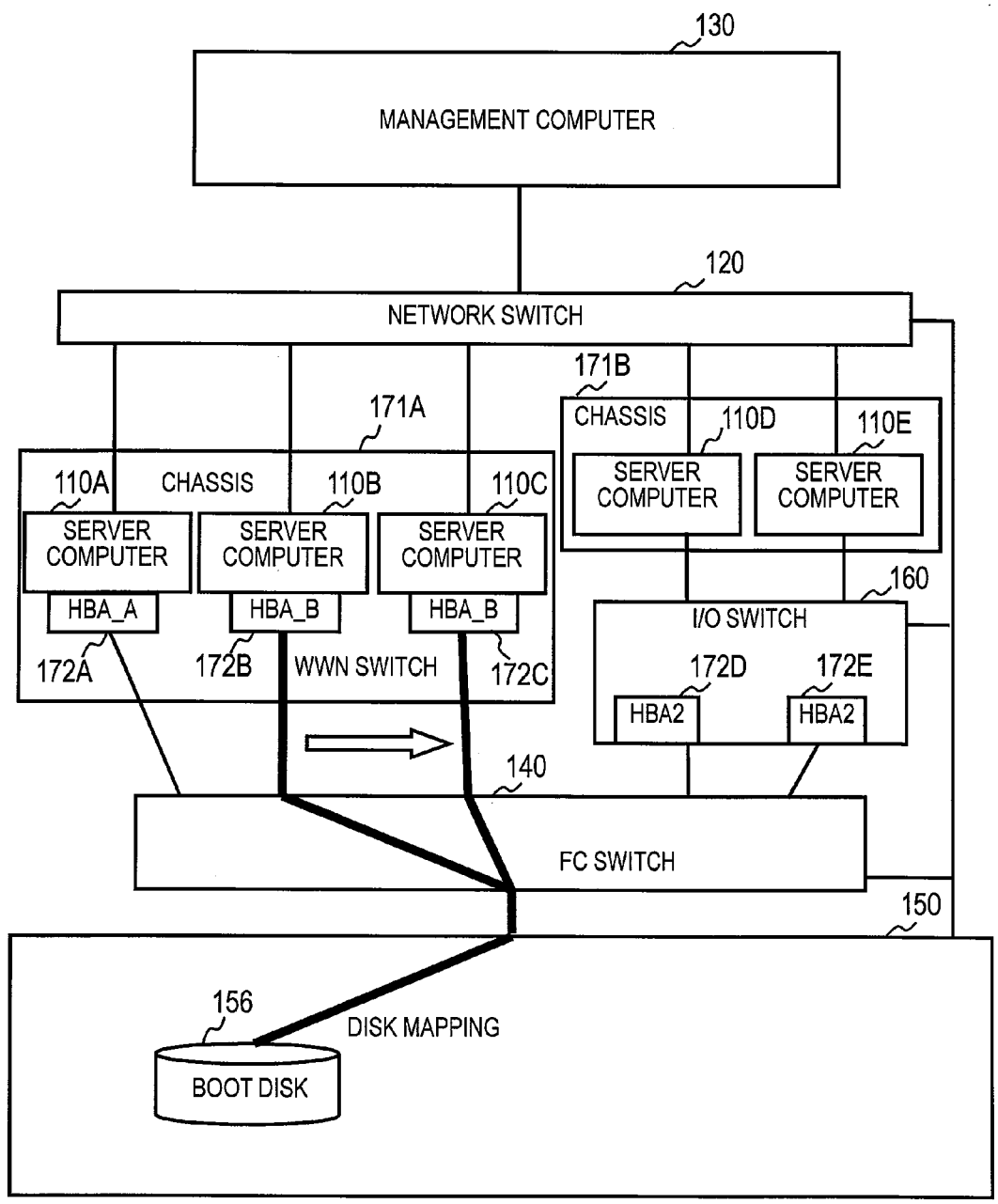
FIG. 5B is a diagram showing a server computer switch method in the embodiment.

FIG. 5B is a diagram showing the WWN switch method and the mapping change method. Although the both methods are shown in FIG. 5B, the switch of the server computers is according to one switch method. In an example of FIG. 5B, an active combination of the active server computer 110B and the active HBA 172B (switch origin combination) is switched to a standby combination of the standby server computer 110C and the standby HBA 172C (switch destination combination). For example, a switch is made to the switch destination combination if a failure occurs in the active server computer 110B or the active HBA 172B.

The WWN switch method switches an assignment destination of a WWN. The WWN is a unique identifier of the HBA in the SAN. The WWN switch method assigns a virtualized WWN to the HBA. The WWN switch method assigns and changes the WWN assigned to the switch origin HBA to the switch destination HBA. In this example, the WWN switch method reassigns the WWN assigned to the active HBA 172B to the standby HBA 172C. For example, the chassis controller of the chassis 171A or the server computer 110C changes the WWN of the standby HBA 172C in accordance with an instruction from the management computer 130.

The storage controller 152 controls an access to the volume by mapping the HBA and the volume identified by the WWN. The storage controller 152 permits only an access from the HBA of the WWN assigned to the volume. In the example of FIG. 5B, the active server computer 110B accesses the volume 156 of the boot disk via the active HBA 172B. The boot disk volume 156 stores the OS used in the server computers and task applications for executing tasks.

Since the WWN of the switch destination standby HBA 172C is the same as that of the switch origin active HBA 172B, the storage system 150 receives an access to the volume 156 from the standby server computer 110C via the standby HBA 172C.

On the other hand, the mapping change method changes mapping between the WWN and the volume in the storage system 150. In this example, the storage controller 152 changes management information according to an instruction from the management computer 130 and changes the WWN of the active HBA 172B mapped to the volume 156 to that of the standby HBA 172C. After a switch from the active combination to the standby combination, the storage controller 152 receives an access to the volume 156 from the standby server computer 110C via the standby HBA 172C newly mapped to the volume 156.

Figure 5C:
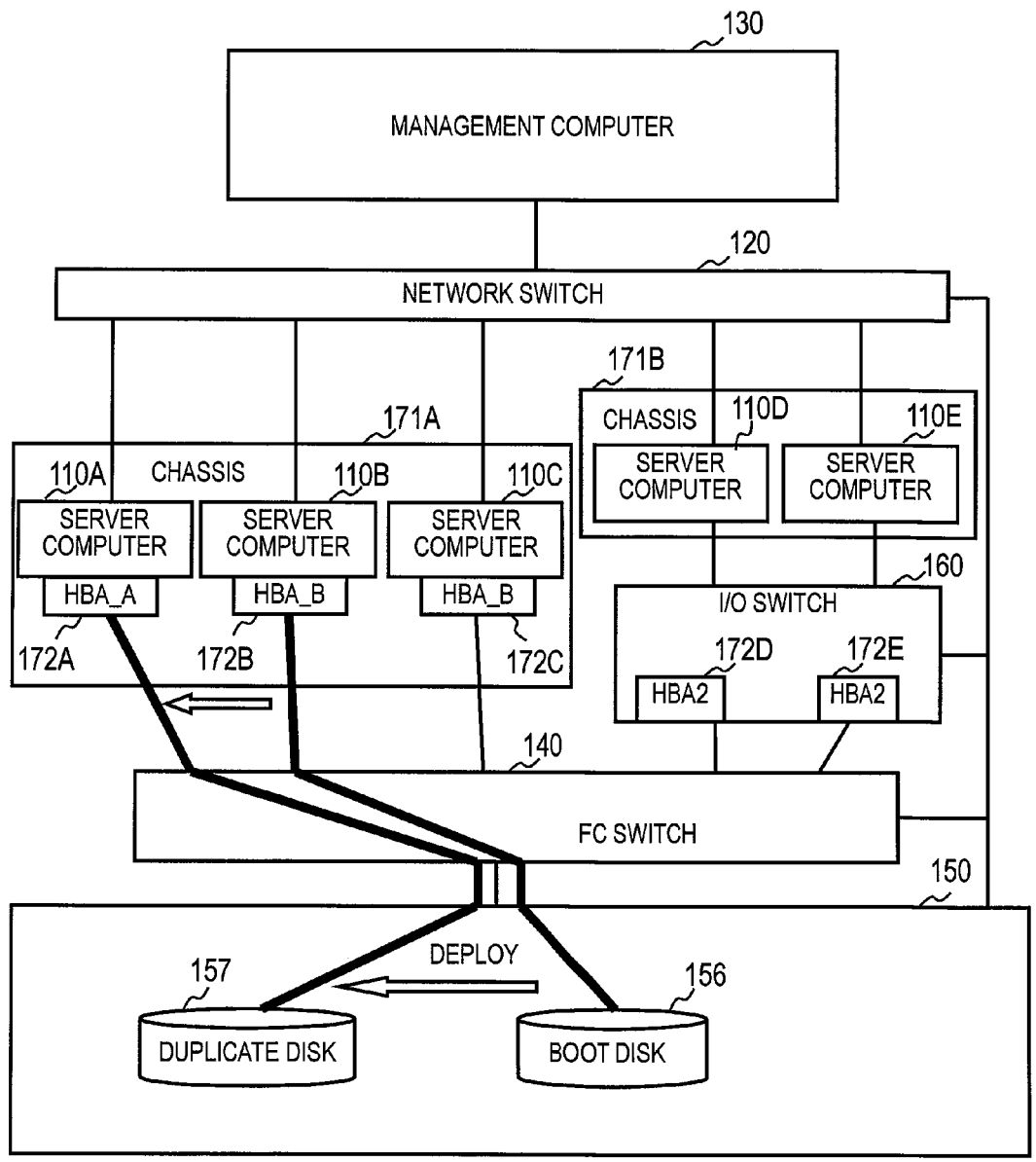
FIG. 5C is a diagram showing a server computer switch method in the embodiment.

FIG. 5C is a diagram showing the deploy method. The deploy method connects a duplicate volume 157 of the active boot disk volume 156 or the volume obtained by restoring the active volume 156 by a backup image to the switch destination HBA and the switch destination server computer. The switch destination server computer accesses the duplicate volume 157 or the restored boot disk volume 156 via the switch destination HBA.

In an example of FIG. 5C, an active combination of the active server computer 110B and the active HBA 172B (switch origin combination) is switched to a standby combination of the standby server computer 110A and the standby HBA 172A (switch destination combination). The active server computer 110B accesses the boot disk volume 156 via the active HBA 172B.

For example, the storage controller 152 generates the duplicate volume 157 of the volume 156 in advance. The storage controller 152 associates the WWN of the standby HBA 172A and the duplicate volume 157 according to an instruction from the management computer 130. The standby server computer 110A having taken over the task from the active server computer 110B can access the duplicate volume 157 via the standby HBA 172A.

As described above, the deploy method may use the boot disk volume 156 restored by the backup image. The storage controller 152 acquires the backup image of the boot disk volume 156 according to an instruction from the management computer 130, thereby restoring the boot disk volume 156. The storage controller 152 associates the WWN of the standby HBA 172A and the boot disk volume 156 according to an instruction from the management computer 130. The standby server computer 110A having taken over the task from the active server computer 110B can access the boot disk volume 156 via the standby HBA 172A.

The information stored in the management computer 130 (each table shown in FIG. 2) is described with reference to the drawings. These tables are referred to in switching the server computer and/or evaluating the arrangement position of the standby server computer. The management computer 130 can acquire the information of each table from the other apparatuses in the system or the administrator.

FIG. 6 shows a configuration example of the server management table 215. The server management table 215 stores configuration information of the server computers, information of the apparatuses connected to the server computers and the like. The server management table 215 manages the apparatuses such as the HBAs assigned to the server computers, the FC switch and the I/O switch.

Specifically, the server management table 215 includes a server identifier column 601, a processor configuration column 602, a memory capacity column 603, an adapter identifier column 604, a connection FC-SW (Fiber Channel-SWitch) port column 605, an I/O switch presence/absence column 606, a server connection I/O port column 607 and a chassis identifier column 608. In the present embodiment, terms "identification information", "identifier", "name", and "ID" can be substituted for each other unless particularly mentioned.

The server identifier column 601 stores the identifiers of the server computers included in the system. The processor configuration column 602 stores processor configuration information of the server computer of each entry. In an example of FIG. 6, information on the processor name, the number of cores and a clock frequency are stored. The memory capacity column 603 stores a memory capacity of the server computer of each entry.

The adapter identifier column 604 stores the identifier of the HBA connected (assigned) to the server computer of each entry. The connection FC-SW port column 605 stores the identifier of the FC switch 140 connected to the HBA of each entry and the port number of the FC switch 140. In the example of FIG. 6, letters "PORT" are attached to each port number to facilitate understanding.

The I/O switch presence/absence column 606 stores I/O switch connection information for the server computer of each entry. "PRESENT" is stored in the I/O switch presence/absence column 606 if the server computer is connected to the I/O switch 160, and "ABSENT" is stored if it is not connected.

The server connection I/O port column 607 stores the identifier of the I/O switch 160 and the port number thereof connected to the server computer of each entry. In the example of FIG. 6, letters "PORT" are attached to each port number to facilitate understanding.

If the server computer of the entry is not connected to the I/O switch 160, a field of the server connection I/O port column 607 in that entry does not store information on the I/O switch 160 and stores a predetermined value (initial value). Thus, only the entries in which the value of the I/O switch presence/absence column 606 is "PRESENT" store information on the I/O switch 160 in the server connection I/O port column 607.

The chassis identifier column 608 stores the identifier of the chassis in which each server computer arranged in the system is housed. In this example, either one of the chassis identifiers Chassis1, Chassis2 of the two chassis 171A, 172B are stored in each field.

FIG. 7 shows a configuration example of the server switch management table 216. The server switch management table 216 stores information on the operation forms, tasks and the like of the server computers. The server switch management table 216 enables a switch of the server computer corresponding to the operation by managing the active servers, the standby servers and the operation of each active server.

Specifically, the server switch management table 216 includes a server identifier column 701, an operation form column 702, an operation identifier column 703 and a server state column 704. Information of the server identifier column 701 is the same as that of the server identifier column 601.

The operation form column 702 stores operation form information indicating whether the server computer of each entry is an active server performing a task or a standby server. The operation identifier column 703 stores the identifier of the task performed by each active server computer (operation identifier). The operation identifier is uniquely assigned to each task, and nothing is stored in the column 703 in the case of the standby server performing no task.

The server state column 704 stores server state information of the server computer of each entry. For example, if the server computer in the entry is normally operating, "NORMAL" is stored in a field of that entry of the server state column 704. In the event of a failure in the server computer in the entry, "FAILURE" is stored in a field of that entry of the server state column 704. If a switch has been made from the active server to the standby server, "SWITCH" is stored as the server state information of that standby server.

FIG. 8 shows a configuration example of the switch strategy table 217. The switch strategy table 217 stores information such as times required to recover the switch methods and the types of the HBAs corresponding to the switch methods. The management computer 130 selects candidates for the switch destination server computer and HBA by referring to the switch strategy table 217. The management computer 130 further refers to the switch strategy table 217 in evaluating the arrangement positions of the standby server computer and the standby HBA. The information of the switch strategy table 217 is configured by the administrator.

The switch strategy table 217 specifically includes a switch method column 801, a switch required time column 802, an HBA type column 803, an I/O switch necessity column 804 and a priority column 805.

The switch method column 801 stores the names of the above four types of switch methods. The switch required time column 802 stores a time required from the occurrence of a failure to the recovery of the failure in each switch method. The HBA type column 803 stores the types of the HBAs usable by each switch method. Each field of the I/O switch necessity column 804 indicates whether or not the switch method of the same entry requires the I/O switch.

If the value of a field of the I/O switch necessity column 804 is "NECESSARY", the switch method of that entry requires the I/O switch. If the value of a field of the I/O switch necessity column 804 is "UNNECESSARY", the switch method of that entry does not require the I/O switch.

Specifically, the deploy method can use the HBA_A and HBA_B and does not require the I/O switch. The disk mapping change method can use only the HBA_A. The WWN switch method can use the HBA_A and HBA_B and does not require the I/O switch. The adapter inheritance method can use the HBA_A and HBA_B, but requires the I/O switch to use those.

The priority column 805 stores the priority of each switch method. In an example of FIG. 8, the greater the numerical value, the higher the priority (priority level). That is, the adapter inheritance method has a highest priority level, the WWN switch method has a second highest priority level, the disk mapping method has a third highest priority level and the deploy method has a lowest priority level.

FIG. 9 shows a configuration of the switch requirement table 218. The switch requirement table 218 stores information such as the hardware configurations and allowable switching times of the server computers necessary for tasks (applications). Specifically, the switch requirement table 218 includes an operation identifier column 901, a processor's minimum necessary performance column 902, a memory's minimum necessary performance column 903, a processor's recommended performance column 904, a memory's recommended performance column 905 and an allowable switching time column 906. These pieces of data are configured by the administrator.

The operation identifier column 901 stores the identifiers of the tasks being performed by the active servers. The processor's minimum necessary performance column 902 stores information on the processor's minimum necessary performance required for the server computer used in each task. The memory's minimum necessary performance column 903 stores information on the memory's minimum necessary performance required for the server computer used in each task.

The processor's recommended performance column 904 stores information on the processor's performance recommended by the server computer used in each task. The memory's recommended performance column 905 stores information on the memory's performance recommended by the server computer used in each task. The allowable switching time column 906 stores times operationally allowable from the occurrence of a failure to the recovery in the switch of the server computer. If no requested value or recommended value is present, the column 902 to 906 stores a predetermined value (initial value).

FIG. 10 shows a configuration example of the I/O switch management table 219. The I/O switch management table 219 manages the apparatuses connected to the ports of the I/O switch and unassigned ports in the system. Specifically, the I/O switch management table 219 includes an I/O switch identifier column 1001, an I/O port column 1002, a connected apparatus column 1003, an apparatus identifier column 1004 and a state column 1005.

The I/O switch identifier column 1001 stores a unique identifier of each I/O switch in the system. The I/O port column 1002 stores port numbers in the I/O switch. The connected apparatus column 1003 stores information indicating the types of the apparatuses connected to the ports of the same entries. If the apparatus is not connected (not assigned), a field of the connected apparatus column 1003 stores "UNASSIGNED".

The apparatus identifier column 1004 stores the identifiers of the connected apparatus of the same entries, i.e. stores apparatus identifiers. In an entry in which "UNASSIGNED" is stored in a field of the connected apparatus column 1003, "UNASSIGNED" is stored also in a field of the apparatus identifier column 1004. A field of the state column 1005 stores state information of the connected apparatus of the same entry. "NORMAL" is stored if the connected apparatus is normally operating and "FAILURE" is stored if a failure has occurred.

FIG. 11 shows a configuration example of the FC switch management table 220. The FC switch management table 220 manages the apparatuses connected to the FC switch in the system. The FC switch management table 220 includes an FC switch identifier column 1101, an FC port column 1102, a connected apparatus column 1103, an apparatus identifier column 1104 and a state column 1105.

The FC switch identifier column 1101 stores a unique identifier of each FC switch in the system. The FC port column 1102 stores port numbers in the FC switch. The connected apparatus column 1103 stores information indicating the types of the apparatuses to be connected to the ports of the same entries. If the apparatus is not connected (not assigned), a field of the connected apparatus column 1103 stores "UNASSIGNED".

The apparatus identifier column 1104 stores the identifiers of the connected apparatuses of the same entries, i.e. stores the apparatus identifiers. In an entry in which "UNASSIGNED" is stored in a field of the connected apparatus column 1103, "UNASSIGNED" is stored also in a field of the apparatus identifier column 1104. A field of the state column 1105 stores state information of the connected apparatus of the same entry. "NORMAL" is stored if the connected apparatus is normally operating and "FAILURE" is stored if a failure has occurred.

FIG. 12 shows a configuration example of the HBA management table 221 storing management information of the HBAs. The HBA management table 221 includes an adapter identifier column 1201, a HBA type column 1202, a WWN column 1203 and an assigned volume column 1204. The adapter identifier column 1201 stores unique identifiers of the I/O adapters (HBAs) connected to the server computers in the system. The HBA type column 1202 stores the type of the HBA of each entry. In this example, there are two HBA types of HBA_A and HBA_B.

The WWN column 1203 stores the WWN assigned to the HBA of each entry. Each HBA has as many WWNs as the ports. In an example of FIG. 12, the HBA1 has one port and other HBAs have two ports. The assigned volume column 1204 stores the identifiers of the volumes assigned to the WWNs of the same entries. If no volume is assigned to the WWN, the value of the assigned volume column 1204 of that WWN is a predetermined (initial value).

FIG. 13 shows a configuration example of the volume management table 222. The volume management table 222 includes a volume identifier column 1301, a port identifier column 1302, a domain identifier column 1303, a backup image column 1304, a duplicate volume column 1305 and a WWN column 1306.

The volume identifier column 1301 stores unique volume identifiers in the system. The port identifier column 1302 stores the identifier of the port of the storage system 150 assigned to each volume. The domain identifier column 1303 stores a domain ID of a host group related to each volume.

The backup image column 1304 stores information indicating a storage destination of the backup image of each volume. If there is no backup image of the volume, the value of a field of the column 1304 of that entry is a predetermined value (initial value).

The duplicate volume column 1305 stores the identifier of the storage system storing the duplicate volume of each volume and volume identifiers. If there is no duplicate volume corresponding to the volume, the value of a field of the column 1305 of that entry is a predetermined value (initial value). Each field of the WWN column 1306 stores the WWN of the HBA assigned to the volume in the same entry.

FIG. 14 shows a configuration example of the chassis management table 223. The chassis management table 223 includes information on the apparatus mounted in each slot of each chassis in the system. The chassis management table 223 includes a chassis identifier column 1401, an apparatus type column 1402, a slot number column 1403 and an apparatus identifier column 1404.

The chassis identifier column 1401 stores the identifiers of the chassis in the system. In this example, the identifiers Chassis1, Chassis2 of the two chassis 171A, 171B are registered. The type column 1402 stores the type of the apparatus (type of the slot) mounted in each slot of each chassis. "HOST" indicates the server computer and "ADAPTER" indicates the HBA. The slot of "HOST" is the slot for the server computer and that of "ADAPTER" is the slot for the HBA.

The slot number column 1403 stores the slot number of each slot. The slot number is unique in the same type of slots in each chassis. In the chassis 171A, the server computer and the HBA having the matching slot number are connected. The apparatus identifier column 1404 stores the identifier of the apparatus mounted in each slot, in this example, that of the server computer or the HBA. If no apparatus is mounted in the slot, a field of the apparatus identifier column 1404 in that entry stores a predetermined value.

Figure 15:
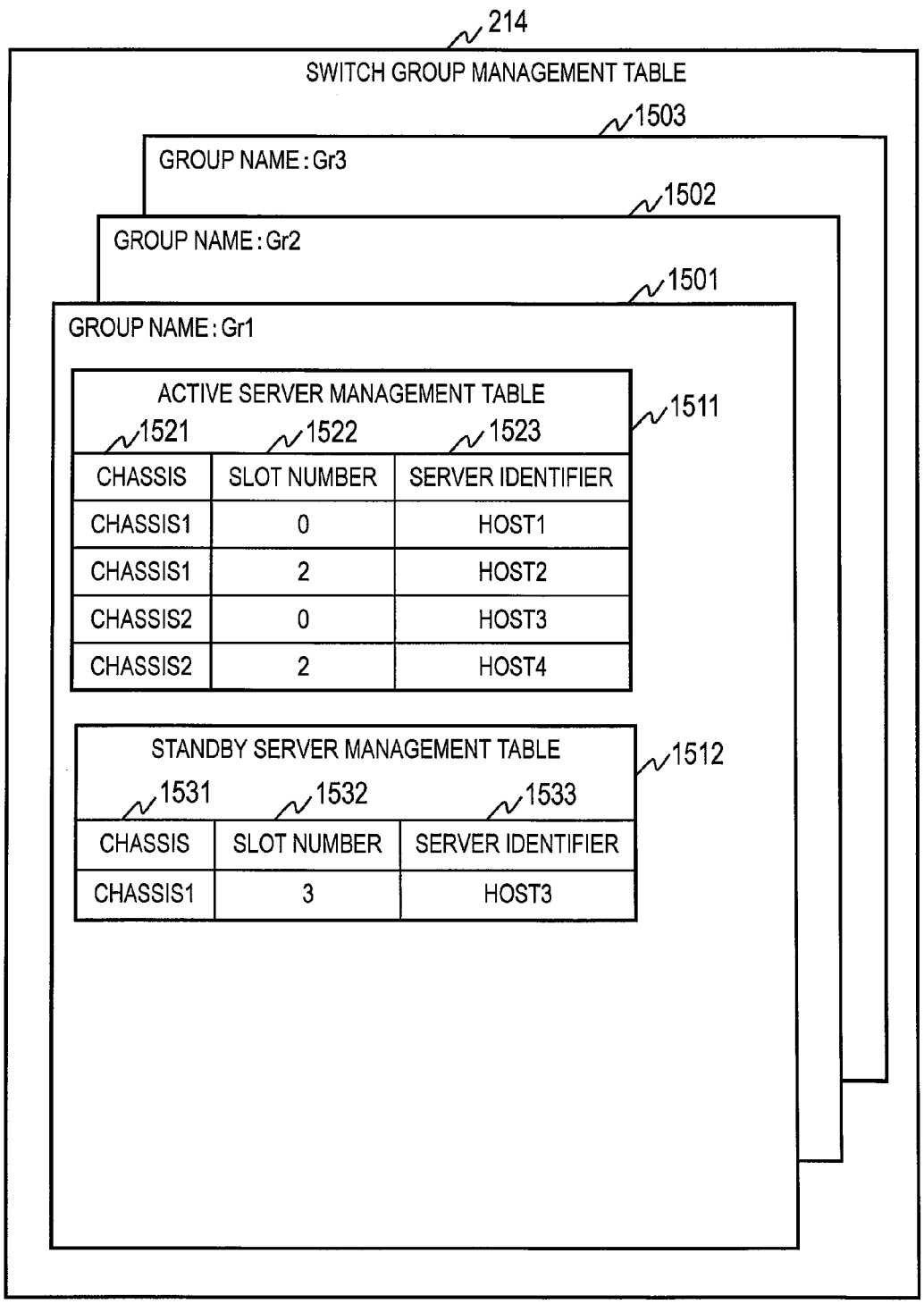
FIG. 15 is a diagram showing a configuration example of a switch group management table of the embodiment.

FIG. 15 shows a configuration example of the switch group management table 214. A switch group is defined as a group in which the server computers can be switched. The system can switch the server computers in the switch group, but cannot switch the server computer belonging to a certain switch group to that belonging to another switch group.

In the example of FIG. 15, the switch group management table 214 includes tables 1501 to 1503 of three switch groups. The names of the respective groups are Gr1, Gr2 and Gr3. In FIG. 15, the table 1501 of the switch group Gr1 is specifically shown. The table 1501 of the switch group Gr1 includes an active server management table 1511 and a standby server management table 1512.

The active server management table 1511 stores information on the active server computers belonging to the switch group Gr1. The standby server management table 1512 stores information on the standby server computer belonging to the switch group Gr1. The tables 1502, 1503 of the other switch groups also include these two management tables.

The active server management table 1511 includes a chassis column 1521, a slot number column 1522 and a server identifier column 1523. The chassis column 1521 stores the identifier of the chassis in which each active server computer belonging to the group is mounted. The slot number column 1522 stores the slot number of the slot in which each active server computer is mounted. The server identifier column 1523 stores the identifier of each active server computer.

The standby server management table 1512 includes a chassis column 1531, a slot number column 1532 and a server identifier column 1533. The chassis column 1521 stores the identifier of the chassis in which each standby server computer belonging to the group is mounted. The slot number column 1532 stores the slot number of the slot in which each standby server computer is mounted. The server identifier column 1533 stores the identifier of each standby server computer. It should be noted that the switch groups may not be defined.

FIG. 16 shows a configuration example of the user request storage table 211. The user request storage table 211 stores information on requested scores to be referred to in evaluating the arrangement positions of the standby server computers, and data are configured by the administrator (user). Specifically, the user request storage table 211 includes a switch group identifier column 1601, a minimum score column 1602, a maximum score column 1603 and an average score column 1604. How to use information of the minimum score column 1602, the maximum score column 1603 and the average score column 1604 will be described later.

Figure 17:
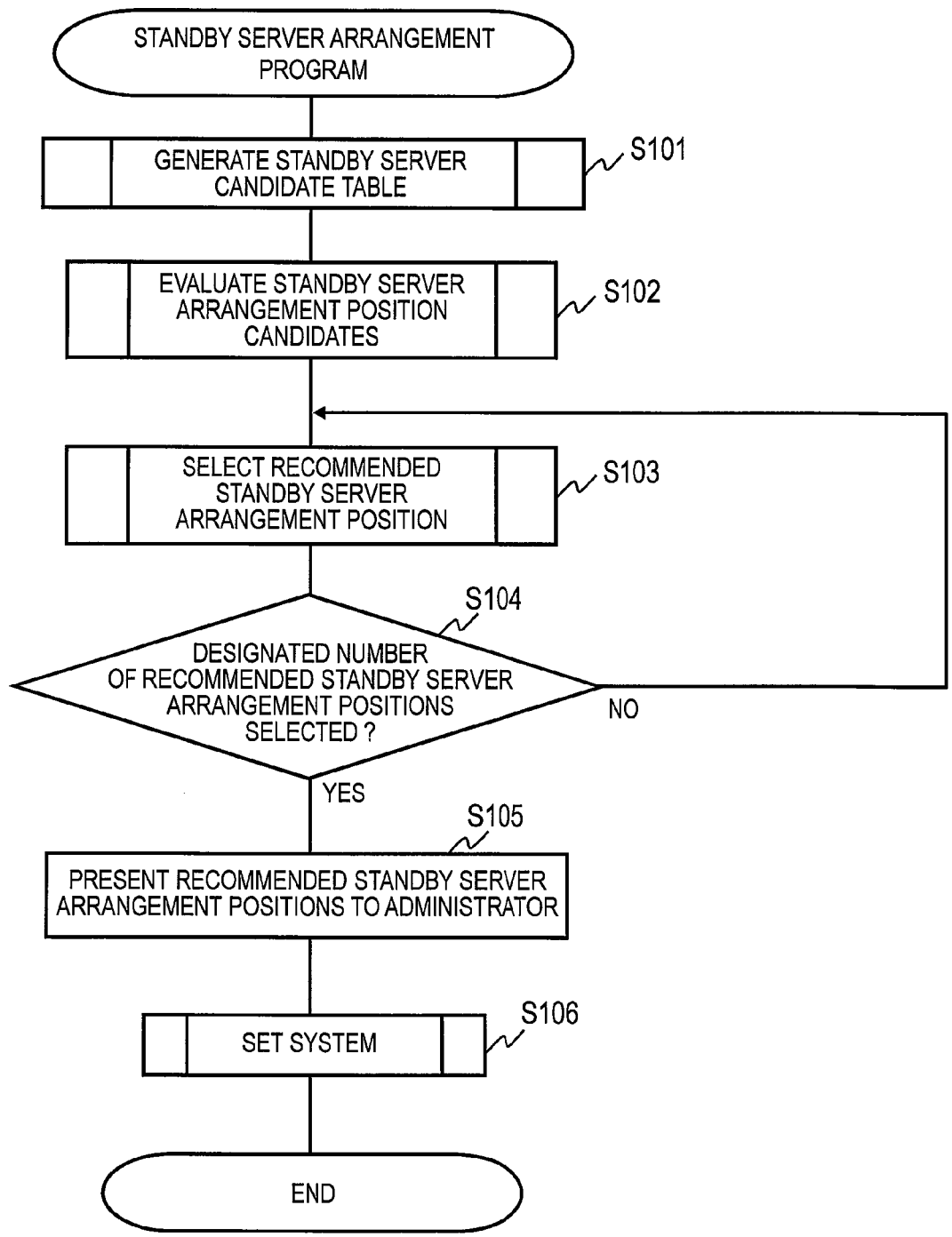
FIG. 17 is a flow chart of a processing example by a standby server arrangement program of the embodiment.

The evaluation of the arrangement positions of the standby server computer and the selection of the recommended arrangement position according to the evaluation by the standby server arrangement program 200 are described below. FIG. 17 is a flow chart outlining processings of the standby server arrangement program 200. The standby server arrangement program 200 first generates the standby server candidate table 212 (S101). The standby server candidate table 212 is described in detail later.

Subsequently, the standby server arrangement program 200 evaluates an arrangement position candidate (arrangement destination candidate) of the standby server computer selected from the standby server candidate table 212 (S102). The standby server arrangement program 200 determines a recommended arrangement position of the standby server computer from the evaluation result of the arrangement position candidate of the standby server computer (S103).

The standby server arrangement program 200 determines whether or not the number of recommended arrangement positions designated by the administrator has been determined (S104). If the number of the determined recommended arrangement positions has not reached the designated number (S104: NO), the standby server arrangement program 200 determines a new recommended arrangement position (S103).

If the number of the determined recommended arrangement positions has reached the designated number (S104: YES), the standby server arrangement program 200 displays the determined recommended arrangement destinations to the administrator (S105). If the standby server computer is arranged at a new position by the administrator, the standby server arrangement program 200 configures the apparatuses in the system in accordance with the new arrangement of the standby server computer (S106).

Figure 18A:
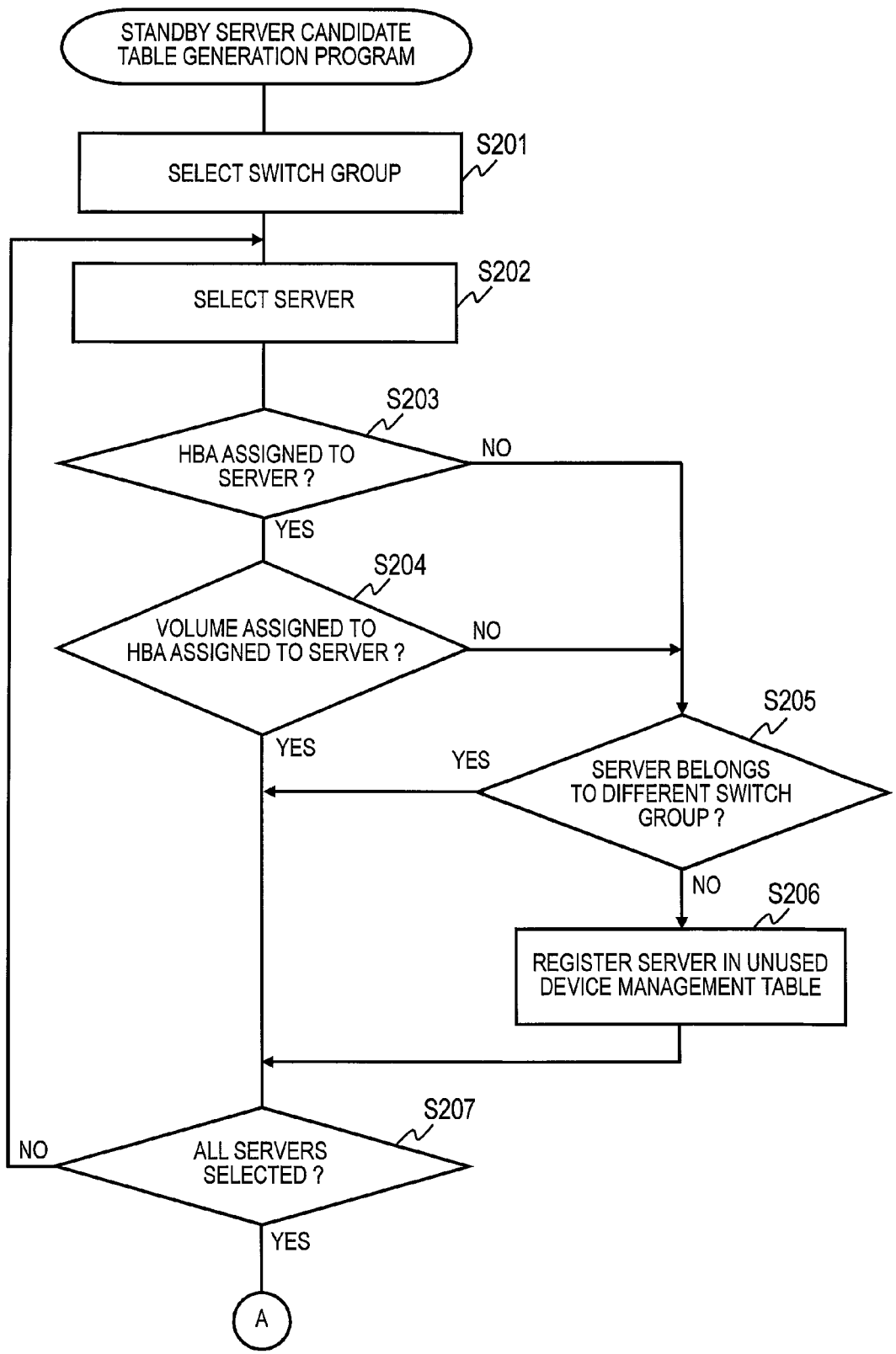
FIG. 18A is a part of a flow chart of a processing example of a standby server candidate table generation program of the embodiment.
Figure 18B:
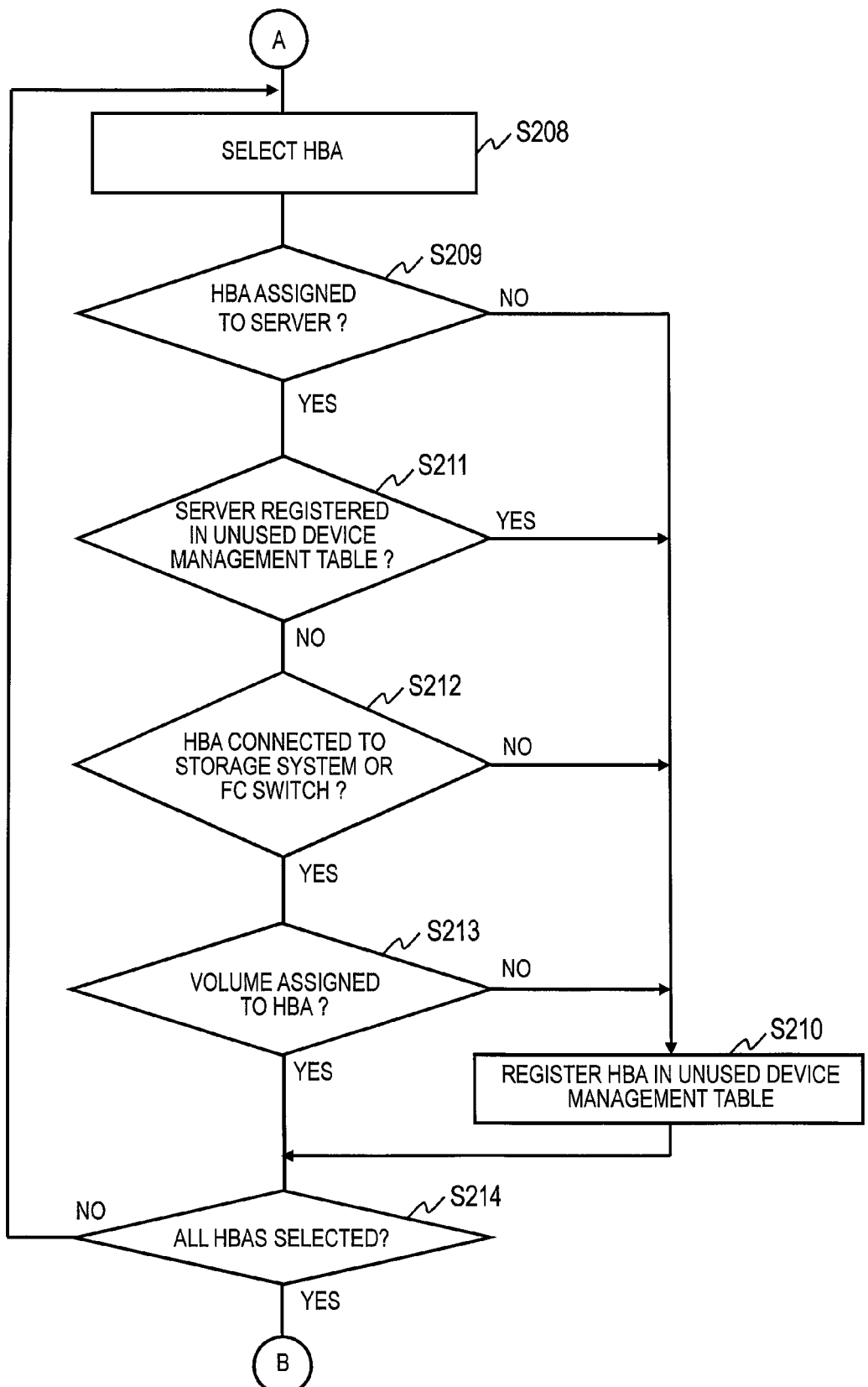
FIG. 18B is a part of the flow chart of the processing example of the standby server candidate table generation program of the embodiment.
Figure 18C:
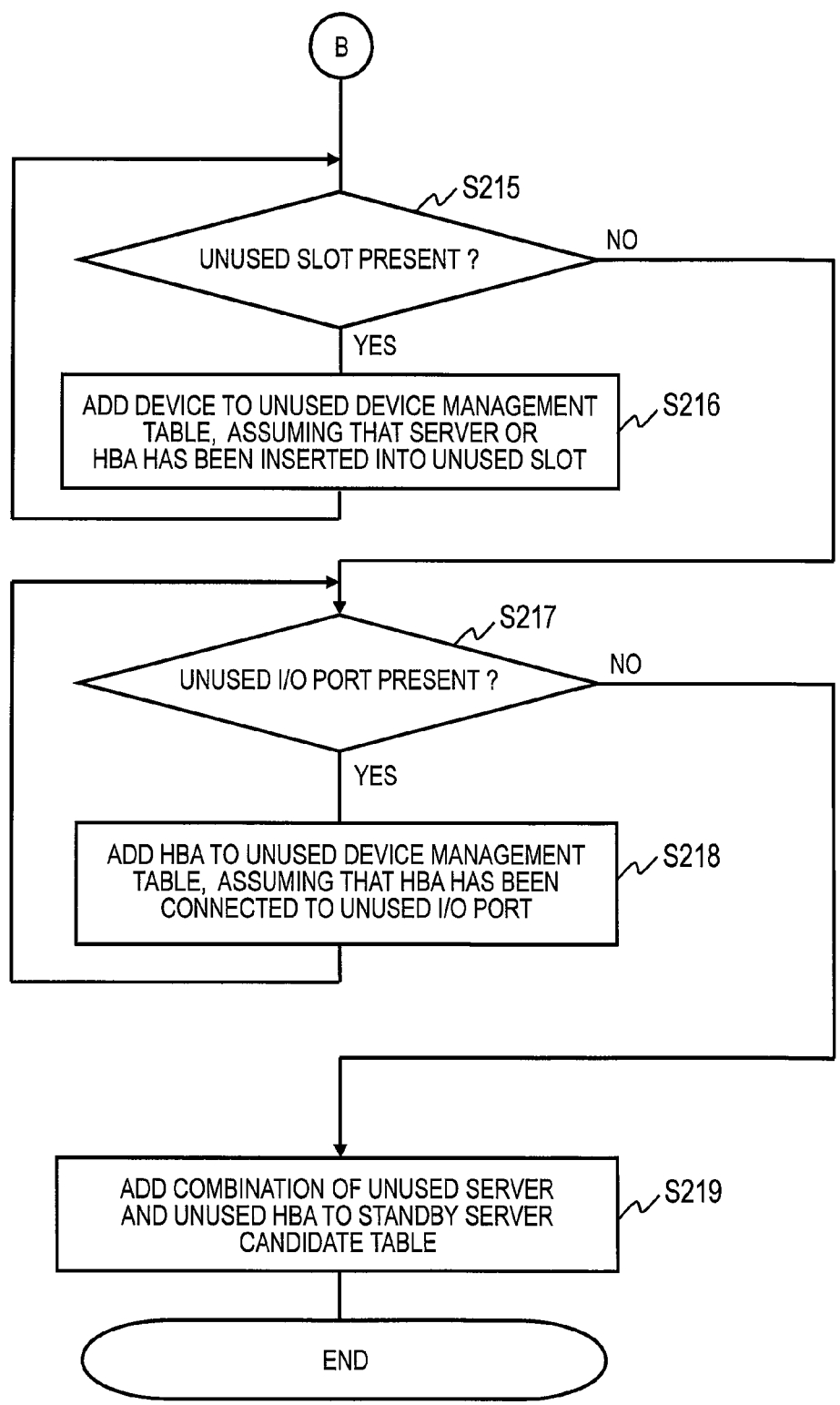
FIG. 18C is a part of the flow chart of the processing example of the standby server candidate table generation program of the embodiment.

Steps described in the flow chart of FIG. 17 are described in detail below. FIGS. 18A to 18C are flow charts showing a processing flow of the standby server candidate table generation program 201. This flow corresponds to Step S101 in FIG. 17. A section of FIG. 18A is followed by a section of FIG. 18B via a connector A, and the section of FIG. 18B is followed by a section of FIG. 18C via a connector B.

The standby server candidate table generation program 201 generates the unused apparatus management table 213 to generate the standby server candidate table 212 and registers unused server computers and HBAs in the unused apparatus management table 213.

The unused server computers and HBAs include the server computers and the HBAs that can be added to a new system in addition to already arranged unused server computers and unused HBAs. The already arranged unused apparatuses (server computers and HBAs) include apparatuses registered as standby apparatuses and those not registered as the standby apparatuses. The standby server candidate table generation program 201 registers combinations of the server computer and the HBA selected from the unused apparatus management table 213 in the standby server candidate table 212.

FIG. 19 shows a configuration example of the unused apparatus management table 213. The unused apparatus management table 213 includes a type column 1901, a server identifier/adapter identifier column 1902, a chassis identifier/I/O switch identifier column 1903 and a slot number/port number column 1904.

The type column 1901 stores the types of the apparatuses and each field stores one of "HOST" indicating the server computer and "ADAPTER" indicating the HBA. In the server identifier/adapter identifier column 1902, a field of an entry of the server computer stores the server identifier and that of an entry of the HBA stores the adapter identifier.

In the chassis identifier/I/O switch identifier column 1903, a field of an entry of the server computer stores the identifier of the chassis in which the server computer is housed. A field of an entry of the HBA connected to the I/O switch stores the identifier of that I/O switch. A field of an entry of the HBA connected one-to-one to the server computer without via the I/O switch stores the identifier of the chassis into which the HBA is incorporated.

In the slot number/port number column 1904, an entry storing the chassis identifier stores the slot number of the slot in which the apparatus of that entry is mounted in that chassis. An entry storing the I/O switch identifier stores the port number of the I/O switch connected to the HBA of that entry. In FIG. 19, letters "SLOT" or "PORT" are attached to each number to facilitate understanding.

For example, the server computer "HOST3" in the unused apparatus management table 213 of FIG. 19 is inserted into the slot having a slot number of "3" in the chassis "CHASSIS1". The HBA "HBA3" is inserted into the slot having a slot number "3" in the chassis "CHASSIS1".

For example, upper two entries (indicated by a rectangle 1911) in the unused apparatus management table 213 of FIG. 19 are the apparatuses already arranged in the system. Other entries (indicated by a rectangle 1912) are the apparatuses temporarily assigned to the unused slots or I/O ports, i.e. apparatuses that can be added to the computer system.

FIG. 20 shows a configuration example of the standby server candidate table 212. The standby server candidate table 212 includes a server identifier column 2001, an adapter identifier column 2002, a minimum score column 2003, a maximum score column 2004 and a total score column 2005.

The standby server candidate table 212 stores all combinations of the server computer and the HBA selected from the unused apparatus management table 213. That is, the server identifier column 2001 stores all the server computers of the unused apparatus management table 213, and the adapter identifier column 2002 stores all the HBAs of the unused apparatus management table 213. A minimum score, a maximum score and a total score for the combination of the server computer and the HBA will be described later. The management computer 130 evaluates the arrangement position of the standby server computer based on these scores.

FIG. 18A shows a flow of registering the unused one of the server computers arranged in the system in the unused apparatus management table 213. In the flow of FIG. 18A, the standby server candidate table generation program 201 registers the unused server in the switch group (e.g. group Gr1 in the switch group management table 214 of FIG. 15) selected by the administrator in the unused apparatus management table 213.

FIG. 18B shows a flow of registering the unused one of the HBAs arranged in the system in the unused apparatus management table 213. FIG. 18C shows a flow of registering the server computer and the HBA, which can be newly added to the system, in the unused apparatus management table and adding a combination of the unused computer and the unused HBA to the standby server candidate table.

In the flow of FIG. 18A, the standby server candidate table generation program 201 selects the unused server computer, which belongs to or can belong to the selected switch group, from the server computers arranged in the system and registers it in the unused apparatus management table 213.

The already arranged unused server computer belonging to the switch group is the standby server computer of the switch group. The already arranged unused server computer that can belong to the switch group is a standby server computer belonging to none of the switch groups. The already arranged unused server computers include the server computers assigned with no HBA.

As shown in FIG. 18A, the standby server candidate table generation program 201 selects the switch group according to an instruction of the administrator (S201). The administrator can designate the switch group directly or by designating the server computer, using the input apparatus 137 of the management computer 130.

Subsequently, the standby server candidate table generation program 201 selects one server computer entry from the server management table 215 (S202). The standby server candidate table generation program 201 determines whether or not the HBA is assigned to the server computer from information on the selected entry (S203). If a field of the adapter identifier column 604 of that entry stores the identifier of the HBA, the HBA is assigned.

If no HBA is assigned to the selected server computer (S203: NO), the standby server candidate table generation program 201 determines whether or not the selected server computer belongs to the switch group different from the one selected in Step S201 by referring to the switch group management table 214 (S205).

If the selected server computer does not belong to another switch group (S205: NO), the standby server candidate table generation program 201 adds the selected server computer to the unused apparatus management table 213. If the selected server computer belongs to another switch group (S205: YES), the standby server candidate table generation program 201 proceeds to Step S207 without registering the selected server computer in the unused apparatus management table 213.

If it is determined in Step S203 that the HBA is assigned to the selected server computer (S203: YES), the standby server candidate table generation program 201 determines whether or not the volume is assigned to the HBA assigned to the selected server by referring to the HBA management table 221 (S204). If an entry selected in the HBA management table 221 stores the volume identifier in the field of the assigned volume column 1204, the volume is assigned to the HBA of that entry.

If no volume is assigned to the HBA (S204: NO), the standby server candidate table generation program 201 proceeds to Step S205. Steps thereafter are as described above. If the volume is assigned to the HBA (S204: YES), the standby server candidate table generation program 201 proceeds to Step S207.

The standby server candidate table generation program 201 determines in Step S207 whether or not all the entries (server computers) in the server management table 215 have been selected. If there is any unselected entry (S207: NO), the standby server candidate table generation program 201 returns to Step S202. If a determination has been made for all the server computers (S207: YES), the standby server candidate table generation program 201 transfers to the section of FIG. 18B via the connector A.

Although the unused server computer is selected for the selected switch group in the above example, the standby server candidate table generation program 201 may perform this flow without considering the switch groups. In that flow, Steps S201 and S205 are omitted. The standby server computers of all the switch groups can be registered in the unused apparatus management table 213.

The standby server candidate table generation program 201 may refer to the performance requested for the server computer in the selection of the unused server computer. For example, performance requested by the user for the server computer belonging to the switch group is defined. The standby server candidate table generation program 201 compares the performance request information and the performances of the already arranged unused server computers and registers only the unused server computers satisfying the requested performance among the already arranged unused server computers in the unused apparatus management table 213.

Subsequently, in the flow shown in FIG. 18B, the standby server candidate table generation program 201 selects the unused HBAs from the HBAs arranged in the computer system and registers them in the unused apparatus management table 213. First, the standby server candidate table generation program 201 selects one entry (HBA) from the HBA management table 221 (S208).

The standby server candidate table generation program 201 determines whether or not the selected HBA is assigned to the server computer by referring to the server management table 215 (S209). If the HBA is assigned to no server computer (S209: NO), the standby server candidate table generation program 201 registers the selected HBA in the unused apparatus management table 213 (S210).

If the HBA is assigned to the server computer (S209: YES), the standby server candidate table generation program 201 determines whether or not the server computer assigned with the selected HBA is registered in the unused apparatus management table 213 (S211). If that server computer is not registered in the unused apparatus management table 213 (S211: NO), the standby server candidate table generation program 201 registers the selected HBA in the unused apparatus management table 213 (S210).

If the assigned server computer is registered in the unused apparatus management table 213 (S211: YES), the standby server candidate table generation program 201 determines whether or not the selected HBA is connected to the storage system or the FC switch (S212). The standby server candidate table generation program 201 makes a determination based on the information obtained from the server management table 215 or the FC switch management table 220. It should be noted that all the HBAs are connected to the storage system 150 via the FC switch 140 in this example.

If the selected HBA is connected neither to the storage system nor to the FC switch (S212: NO), the standby server candidate table generation program 201 registers that HBA in the unused apparatus management table 213 (S210). If the selected HBA is connected to the storage system or the FC switch (S212: YES), the standby server candidate table generation program 201 determines whether or not the volume is assigned to the selected HBA, using the information of the HBA management table 221 (S213).

If a field of the assigned volume column 1204 of the selected entry stores the volume identifier and the volume is assigned to the HBA (S213: YES), the standby server candidate table generation program 201 proceeds to Step S214. If no volume is assigned to the HBA (S213: NO), the standby server candidate table generation program 201 registers that HBA in the unused apparatus management table 213 (S210).

In Step S214, the standby server candidate table generation program 201 determines whether or not all the entries (HBAs) in the HBA management table 221 have been selected. If there is any unselected entry (S214: NO), the standby server candidate table generation program 201 returns to Step S208. If a determination has been made for all the HBAs (S214: YES), the standby server candidate table generation program 201 transfers to the section of FIG. 18C via the connector B.

In the flow shown in FIG. 18C, the standby server candidate table generation program 201 selects the server computers and the HBAs that can be mounted into the unused slots of the chassis and the HBAs that can be connected to empty ports of the I/O switch as the unused apparatuses.

First, the standby server candidate table generation program 201 determines whether or not there is any unused slot in the chassis (chassis 171A, 171B in the example of FIG. 1) of the system by referring to the chassis management table 223 (S215). The unused slot is the unused slot for server computer or that for HBA.

If there is any unused slot (S215: YES), the standby server candidate table generation program 201 registers the apparatus in the unused apparatus management table 213, assuming that the server computer or the HBA has been inserted into that unused slot (S216). Thereafter, the standby server candidate table generation program 201 returns to Step S215 and determines whether or not there is any unused slot.

If there is no unused slot (S215: NO), the standby server candidate table generation program 201 determines whether or not there is any unused (unassigned) I/O port for HBA by referring to the I/O switch management table 219 (S217). If there is any unused I/O port for HBA (S217: YES), the standby server candidate table generation program 201 registers that HBA in the unused apparatus management table 213, assuming the connection of the HBA to that unused I/O port (S218). Thereafter, the standby server candidate table generation program 201 returns to Step S217 and determines whether or not there is any unused I/O port.

If there is no more unused I/O port for HBA (S217: NO), the standby server candidate table generation program 201 registers combination of the unused computer and the unused HBA obtained from the unused apparatus management table 213 in the standby server candidate table 212 (S219). All the combinations of the unused server computer and the unused HBA of the unused apparatus management table 213 are registered.

Figure 21A:
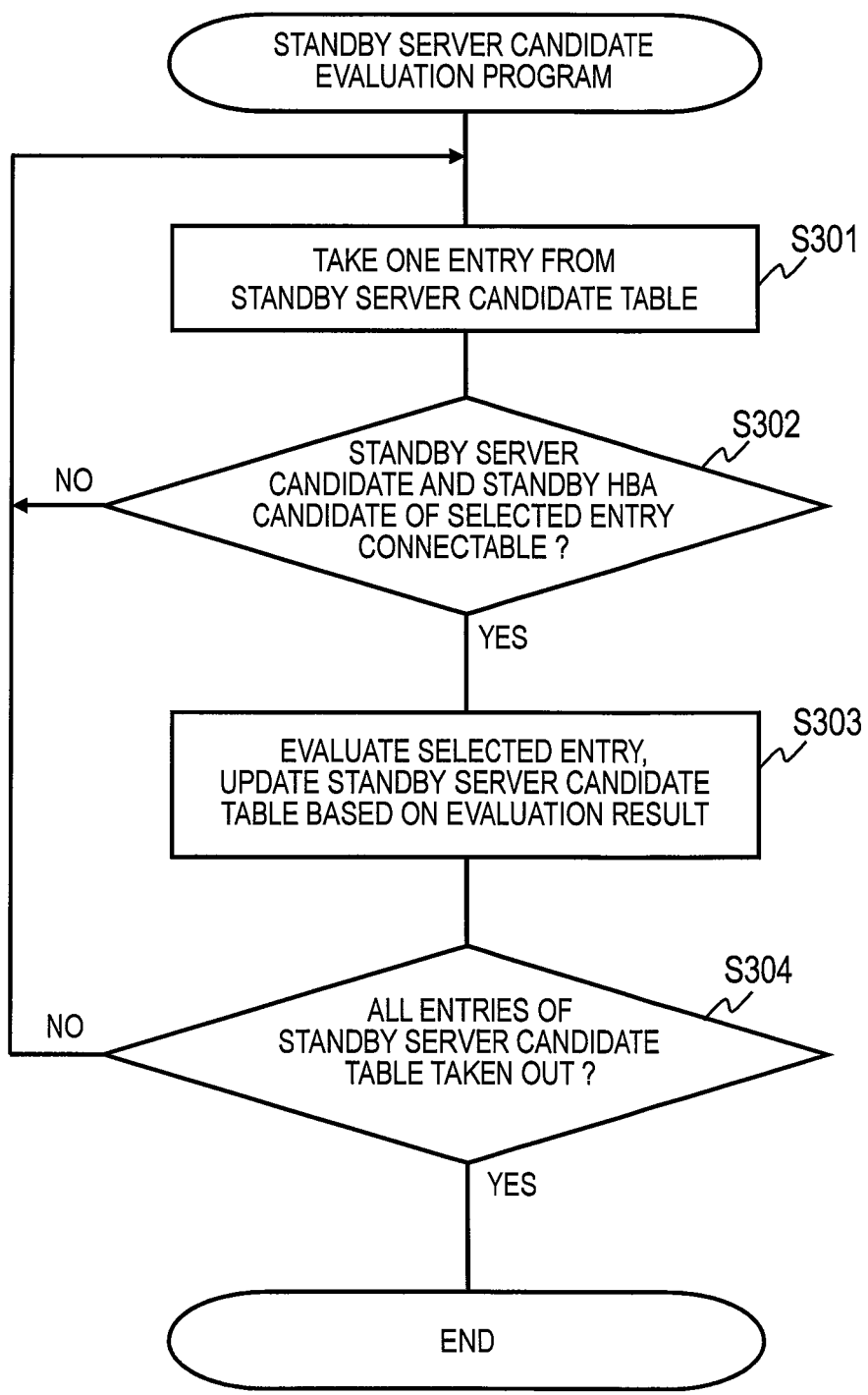
FIG. 21A is a flow chart of a processing example of a standby server candidate evaluation program of the embodiment.
Figure 21B:
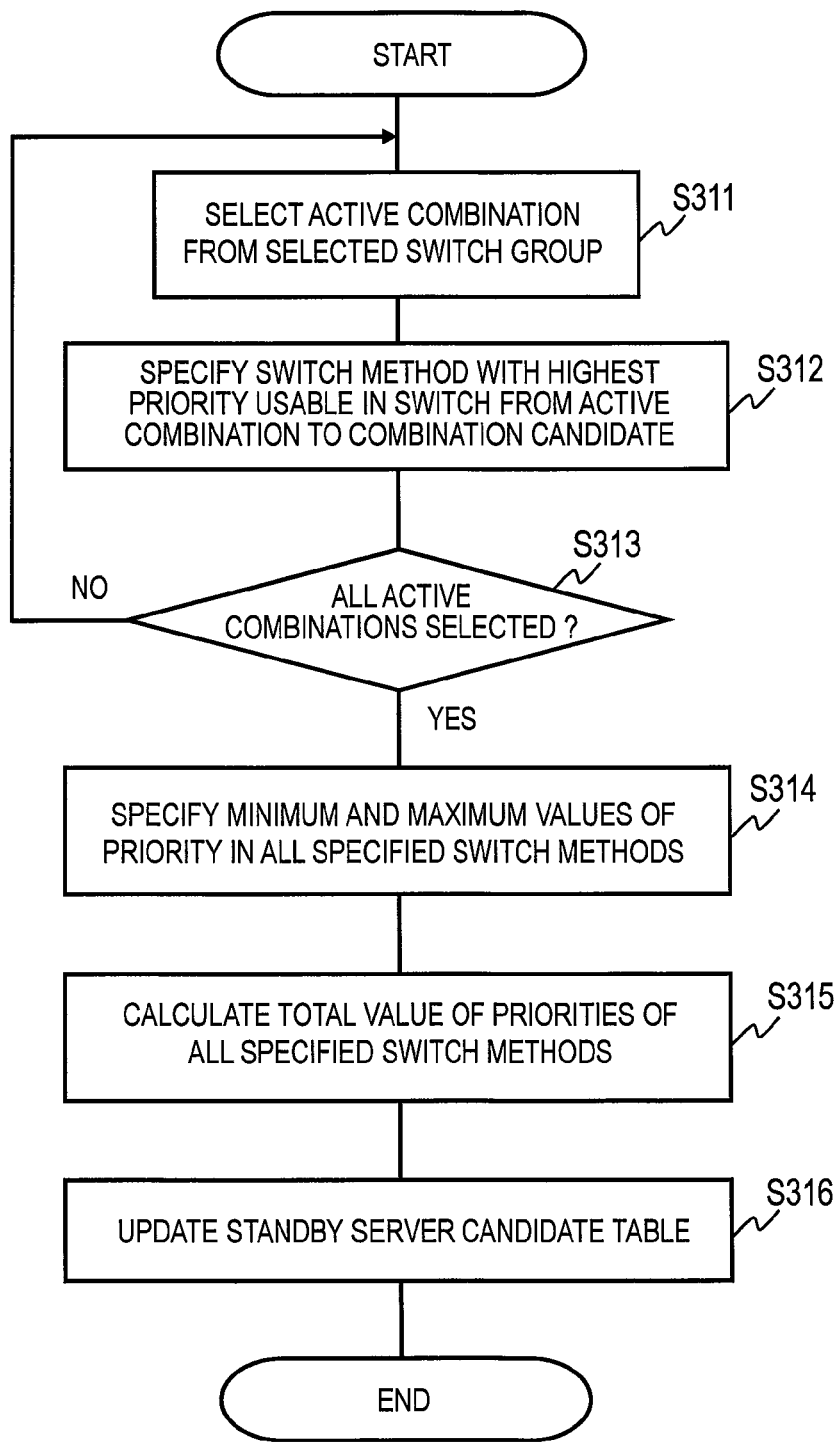
FIG. 21B is a flow chart showing Step S303 in FIG. 21A in detail.
Figure 21C:
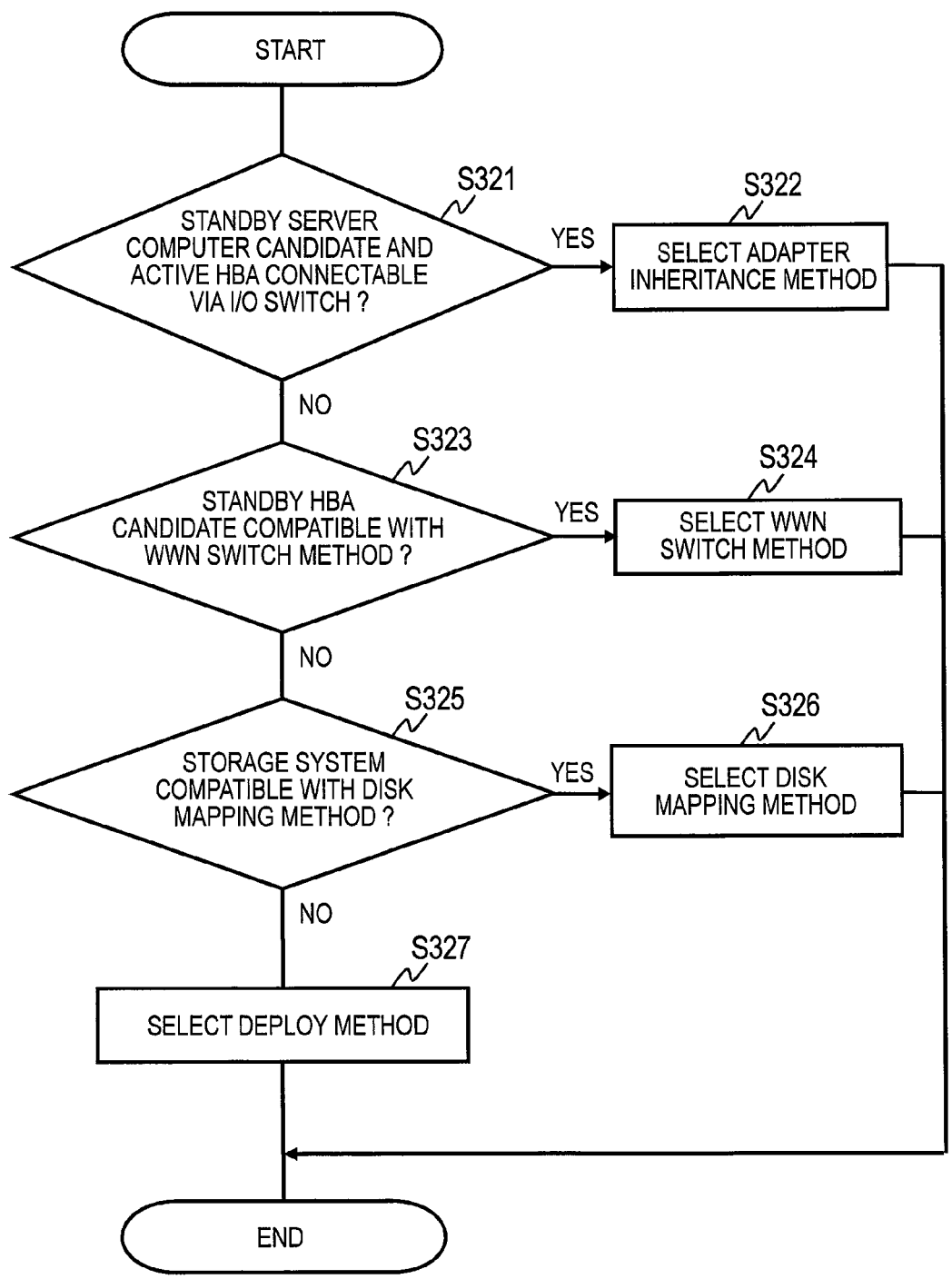
FIG. 21C is a flow chart showing Step S312 in FIG. 21B in detail.

FIGS. 21A to 21C show a flow of the evaluation of the standby server computer candidate by the standby server candidate evaluation program 202. This corresponds to Step S102 in the flow chart of FIG. 17. FIGS. 21B and 21C show Step S302 in FIG. 21A in detail. As shown in FIG. 21A, the standby server candidate evaluation program 202 selects one entry (combination candidate of the standby server computer candidate and the standby HBA candidate) from the standby server candidate table 212 (S301).

The standby server candidate evaluation program 202 determines whether or not the standby server computer candidate and the standby HBA candidate of the selected entry are connectable (S302). If a connection is not possible (S302: NO), the standby server candidate evaluation program 202 stores a predetermined value in the field of each of the minimum score column 2003, the maximum score column 2004 and the total score column 2005 of that entry and selects the next entry (S301).

If two apparatuses of the selected entry are connectable, the standby server candidate evaluation program 202 proceeds to Step S303. The standby server candidate evaluation program 202 can determine the connectability of the apparatuses by referring to the unused apparatus management table 213 and the server management table 215.

In Step S303, the standby server candidate evaluation program 202 evaluates the selected entry, writes an evaluation result in the selected entry in the standby server candidate table 212 and updates the data of the standby server candidate table 212. As shown in FIG. 20, the evaluation result is expressed by a minimum score, a maximum score and a total score. An evaluation method (score calculation method) will be described in detail later.

The standby server candidate evaluation program 202 determines whether or not there is any entry to be selected in the standby server candidate table 212 (S304). If there is any entry to be selected (S304: NO), the standby server candidate evaluation program 202 selects a new entry (S301). If there is no more entry to be selected (S304: YES), the flow is finished.

FIG. 21B shows Step S303 in detail. The standby server candidate evaluation program 202 calculates an evaluation value for each combination of the active server and the active HBA corresponding to the combination of the standby server computer candidate and the standby HBA candidate selected in Step S301. First, the standby server candidate evaluation program 202 selects a combination of the active server computer and the active HBA from the selected switch group (S311).

The standby server candidate evaluation program 202 can select one active server computer in the group selected from the switch group management table 214 and specify the HBA assigned to the selected active server computer by referring to the server management table 215.

Subsequently, the standby server candidate evaluation program 202 can specify the switch method with a highest priority usable in a switch from the selected active combination to the selected standby combination and stores the information thereof in the memory 132 (S312). The priorities of the switch methods are defined in the switch strategy table 217 as described with reference to FIG. 8. How to specify the switch method with a highest priority will be described later with reference to FIG. 21C.

The standby server candidate evaluation program 202 subsequently determines whether or not all the active server computers of the selected switch group in the switch group management table 214 have been selected (S313). If there is any active server computer (active combination) to be evaluated (S313: NO), the standby server candidate evaluation program 202 selects a new combination of the active server computer and the active HBA from the switch group management table 214 and the server management table 215 (S311) and specify the usable switch method with a highest priority (S312).

If an evaluation has been made on all the active combinations for the selected standby combination candidate (S313: YES), the standby server candidate evaluation program 202 calculates scores of the selected standby combination candidate. Specifically, the standby server candidate evaluation program 202 specifies a minimum value and a maximum value of the priority in the switch method specified for each of all the active combinations (S314). The standby server candidate evaluation program 202 further calculates the total of the priority of the specified switch method for all the active combinations (S315).

The standby server candidate evaluation program 202 updates the standby server candidate table 212 based on the evaluation values determined in Steps S314, S315 (S316). Specifically, the standby server candidate evaluation program 202 stores the minimum value specified in Step 314 in a field of the minimum score column 2003 of the selected entry and the maximum value in a field of the maximum score column 2004. Further, the standby server candidate evaluation program 202 stores the total value calculated in Step S315 in a field of the total score column 2005 of the selected entry.

Subsequently, how to specify the switch method with a highest priority in Step S312 is described with reference to FIG. 21C. The standby server candidate evaluation program 202 selects one of the switch methods defined in a decreasing order of the priority and determines whether or not the selected switch method is usable in a switch from the active combination to the standby combination candidate. If the selected switch method is applicable, the standby server candidate evaluation program 202 determines it as the switch method with a highest priority.

The standby server candidate evaluation program 202 first determines whether or not the selected standby server computer is connectable to the HBA assigned to the selected active server computer via the I/O switch (S321). If these are connectable via the I/O switch (S321: YES), the standby server candidate evaluation program 202 selects the adapter inheritance method with a highest priority as the switch method applied for the switch from the selected active combination to the standby combination candidate (S322).

The standby server candidate evaluation program 202 can specify the chassis in which the selected standby server computer is arranged by referring to the unused apparatus management table 213 and specify the I/O switch connected to the server computers of that chassis (including a case where the server computer is not connected to any of the I/O switches) by referring to the server management table 213. The standby server candidate evaluation program 202 can specify the I/O switch connected to the active HBAs (including a case where the HBA is not connected to any of the I/O switches) by referring to the I/O switch management table 219.

If the determination in Step S321 is negative (S321: NO), the standby server candidate evaluation program 202 determines whether or not the standby HBA candidate is compatible with the WWN switch method with a second highest priority (S323). If the standby HBA candidate is compatible with the WWN switch method (S323: YES), the standby server candidate evaluation program 202 selects the WWN switch method as the switch method applied for the switch from the selected active combination to the standby combination candidate (S324).

The standby server candidate evaluation program 202 can specify the switch method compatible with each standby HBA candidate based on the presence or absence of the connection between the HBA type and the I/O switch by referring to the switch strategy table 217. The standby server candidate evaluation program 202 can learn an arrangement position of the standby HBA candidate, i.e. connection to the I/O switch by referring to the unused apparatus management table 213.

If the standby HBA candidate is an existing standby HBA, the standby server candidate evaluation program 202 can specify the HBA type thereof by referring to the HBA management table 221. If the standby HBA candidate is an HBA to be newly added, the standby server candidate evaluation program 202 uses the user-designated HBA type or pre-configured HBA type. Although the usable switch method is determined based on the I/O switch and the HBA type in this example, application conditions may, for example, include another condition (e.g. chassis type).

If the determination in Step S323 is negative (S323: NO), the standby server candidate evaluation program 202 determines whether or not the storage system 150 is compatible with the disk mapping method with a third highest priority (S325). The standby server candidate evaluation program 202 determines whether or not the storage system 150 is compatible with the disk mapping method by the storage controller 152.

If the storage system 150 is compatible with the disk mapping method (S325: YES), the standby server candidate evaluation program 202 selects the disk mapping method as the switch method applied for the switch from the selected active combination to the standby combination candidate (S326). If the determination in Step S325 is negative (S325: NO), the standby server candidate evaluation program 202 selects the deploy method with a lowest priority as the switch method applied for the switch from the selected active combination to the standby combination candidate (S327).

Figure 22:
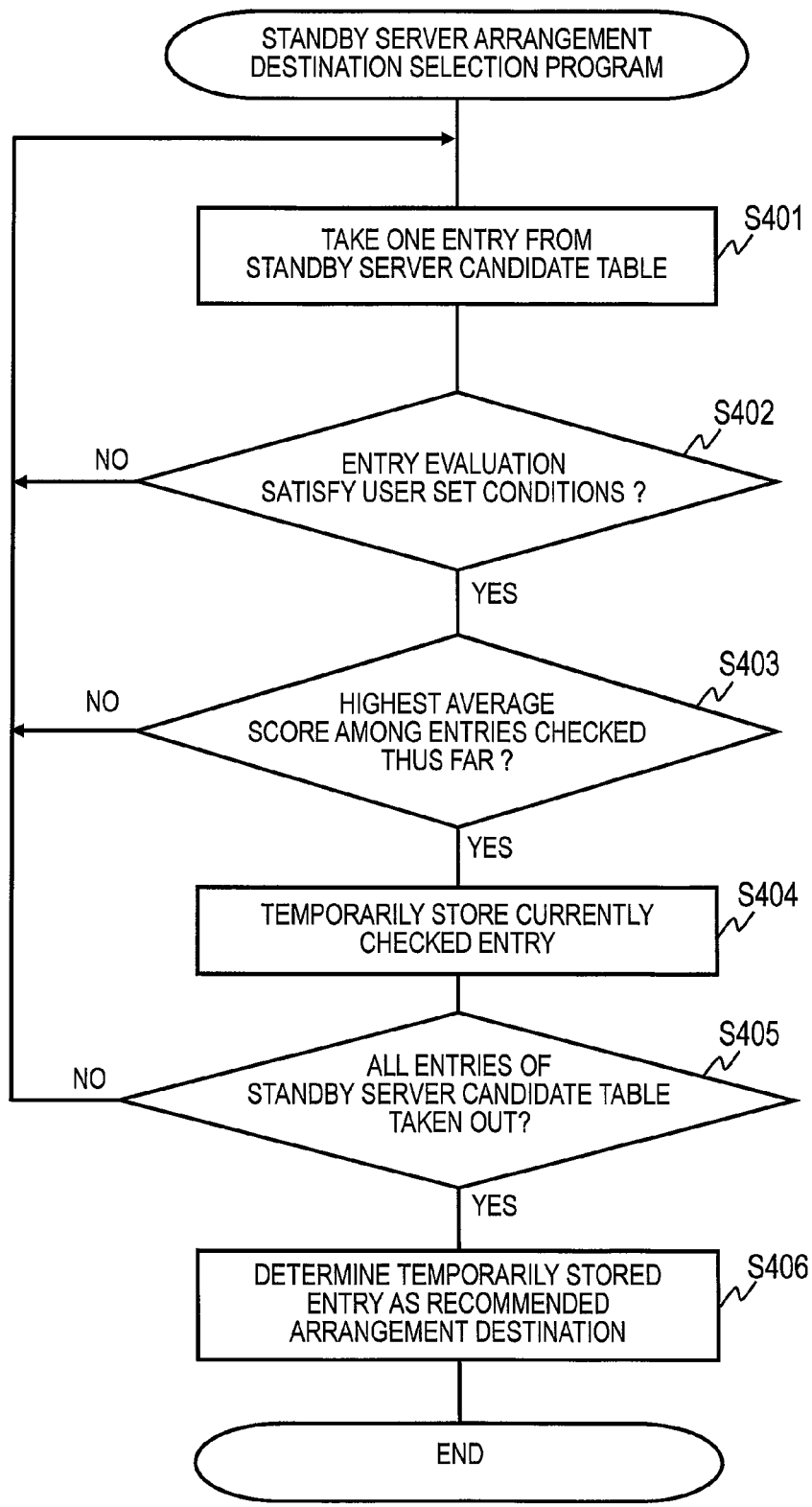
FIG. 22 is a flow chart showing a processing example of a standby server arrangement destination selection program of the embodiment.

FIG. 22 is a flow chart showing processings of the standby server arrangement destination selection program 203. This flow corresponds to Step S103 in the flow chart of FIG. 17. The standby server arrangement destination selection program 203 determines a new recommended arrangement destination of the standby server computer by referring to the updated standby server candidate table 212. In an example of FIG. 22, an arrangement destination candidate of the standby server computer and the standby HBA with a highest degree of recommendation is determined.

First, the standby server arrangement destination selection program 203 selects one entry from the standby server candidate table 212 (S401). The standby server arrangement destination selection program 203 determines whether or not the evaluation (score) of the selected entry satisfies a condition configured by the user (S402). Evaluation conditions are defined in the user request storage table 211.

Although the user request storage table 211 of this example defines requests of each switch group, requests common to all the switch groups may be defined in an example in which the standby server candidate table 212 stores the entries selected from all the switch groups.

The standby server arrangement destination selection program 203 calculates an average score from the total score of the selected entry and compares the average score, the minimum score and the maximum score with values defined in the user request storage table 211. The entry satisfies the condition configured by the user if each score in the entry is not smaller than the value in the user request storage table 211.

Subsequently, the standby server arrangement destination selection program 203 determines whether or not the average score of the current entry is highest among the entries checked thus far (S403). Specifically, the entry having a highest average score among the already checked entries is temporarily stored in the memory 132 (see S404) and the standby server arrangement destination selection program 203 compares the average scores of that entry and the current entry.

If the average score of the current entry is highest (S403: YES), the standby server arrangement destination selection program 203 temporarily stores the current entry as the entry having the highest average score in the memory 132 (S404). If the average score of the current entry is not higher than that of the already checked entry stored in the memory 132 (S403: NO), the standby server arrangement destination selection program 203 determines whether or not there is any entry to be checked in the standby server candidate table 212 (S405).

If there is any entry to be checked (S405:YES), the standby server arrangement destination selection program 203 selects a new entry (S401). If there is no more entry to be checked (S405: NO), the standby server arrangement destination selection program 203 determines the entry temporarily stored in the memory 132 as a most recommended entry (S406) and finishes this flow. The standby server arrangement destination selection program 203 can select a plurality of recommended entries by repeating the flow of FIG. 22.

FIG. 23 shows a display example of the recommended arrangement positions of the standby server computers and the standby HBAs. The standby server arrangement destination selection program 203 causes the display apparatus 138 of the management computer 130 to display one or more new arrangement destination candidates of the standby server computer and the standby HBA selected by the flow of FIG. 22 (Step S105 in FIG. 17). In an example of FIG. 23, the number of new arrangement destinations designated by the administrator is two and the standby server arrangement destination selection program 203 displays two selected recommended arrangement destinations.

In this example, the recommended arrangement position of the standby server computer is indicated by the chassis identifier and the slot number and that of the standby HBA is indicated by the I/O switch identifier and the port number. If the standby HBA at the recommended arrangement position is not connected to the I/O port, that recommended arrangement position is indicated by the chassis identifier and the slot number. FIG. 23 shows the display example and a part of the information of FIG. 23 may be omitted or other information may be added.

Figure 24:
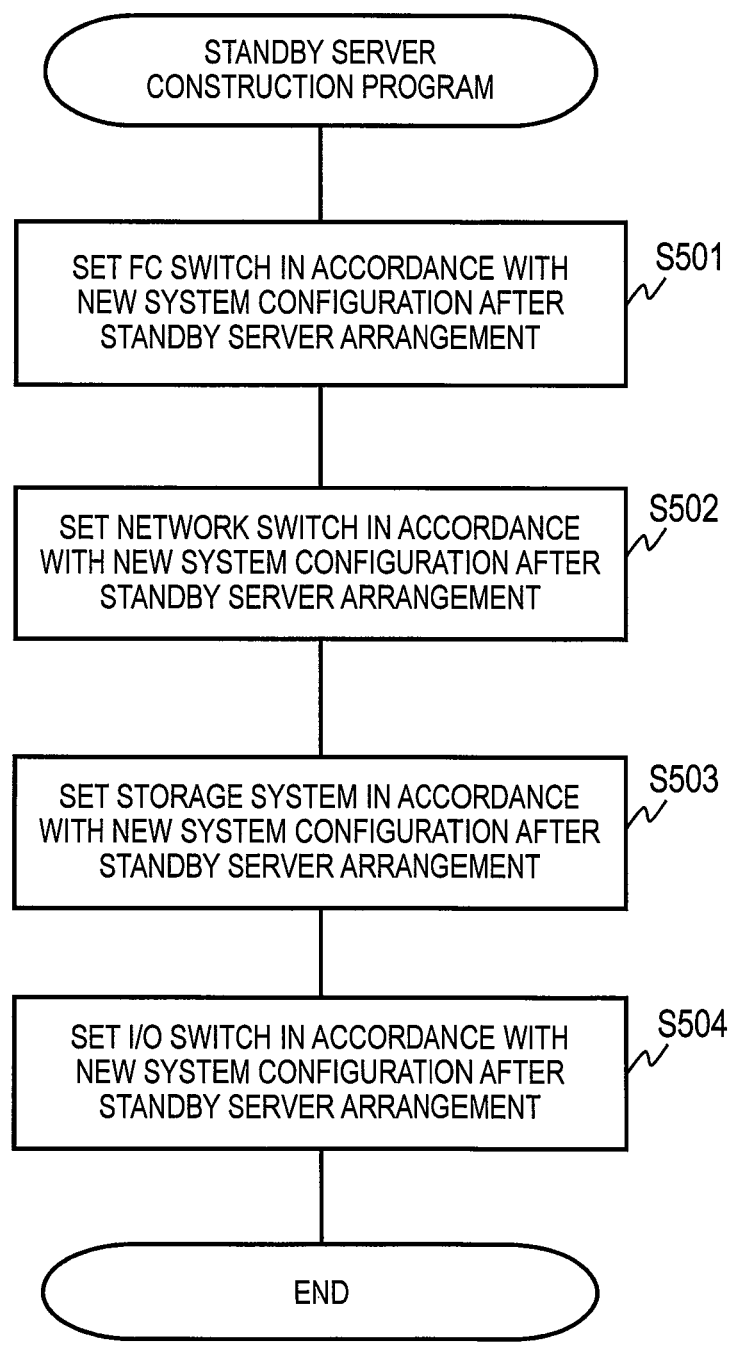
FIG. 24 is a flow chart showing a processing example of a standby server construction program of the embodiment.

FIG. 24 shows a processing flow of the standby server construction program 204. This flow corresponds to Step S106 in FIG. 17. If a new standby server computer is arranged by the administrator, the standby server construction program 204 executes this flow. The arrangement of the new standby server computer is the addition of the new standby server computer or the rearrangement of the existing standby server computer.

The standby server construction program 204 configures the FC switch in accordance with a new system configuration after the standby server arrangement (S501). For example, the standby server construction program 204 reconfigures zoning of the FC switch 140. The standby server construction program 204 configures the network switch 120 in accordance with the new system configuration after the standby server arrangement (S502). For example, the standby server construction program 204 reconfigures a VLAN.

The standby server construction program 204 configures the storage system 150 in accordance with the new system configuration after the standby server arrangement (S503). For example, the standby server construction program 204 reconfigures disk mapping information. The standby server construction program 204 configures the I/O switch 160 in accordance with the new system configuration after the standby server arrangement (S504). For example, the standby server construction program 204 changes mapping of internal ports.

Although the present invention has been described in detail above with reference to the drawings, the present invention is not limited to such a specific configuration and encompasses various changes and equivalent configurations within the scope of the accompanying claims. For example, at least a part of the program may be realized by dedicated hardware. The program can be installed in each computer by a program distribution server or a computer-readable non-transitory storage medium and can be stored in a nonvolatile storage apparatus of each computer.

Although the I/O switch is externally provided outside the chassis in the above example, it may be built in the chassis. Although the task server computers are included in the above example, the present embodiment is applicable to a system including computers different from these.

Although the arrangement position combination candidate of the standby server computer and the standby HBA is evaluated by the switch method in the above example, the management system may refer to different criteria in addition to the priorities of the switch methods. For example, the management system may include the performances of the switch destination standby server computer and HBA in evaluation criteria.

In the above example, an evaluation is made based on three types of scores determined based on the priority of the switch method. The management computer may evaluate the arrangement position based on one or two types of scores out of those. Although the recommended arrangement position is presented to the administrator in the above example, the management system may present information different from this for the evaluation of the arrangement destination candidate of the standby apparatus. For example, the management system may display all the entries evaluated in the standby server candidate table or a plurality of entries with a maximum evaluation.

In the above example, a plurality of combination candidates of the unused server computer and the unused HBA are evaluated. Different from this, the management system may evaluate one combination candidate designated by the administrator in a manner as described above. Further, the management system may evaluate the arrangement destination candidate of the standby apparatus for only some of the active server computers selected in the switch group.

What is claimed is:

1. A management method for a computer system, including a plurality of computers and a plurality of I/O adapters, by a management system, comprising:

selecting a standby combination candidate of an arrangement position candidate of a standby computer and an arrangement position candidate of a standby I/O adapter;

specifying a plurality of active combinations of an arrangement position of an active computer and an arrangement position of an active I/O adapter;

selecting a switch method applicable between the standby combination candidate and each of the plurality of active combinations from a plurality of switch methods;

determining a priority of the selected switch method by referring to priority information associating each of the plurality of switch methods and the priority;

evaluating the standby combination candidate based on the determined priority of the selected switch method;

selecting the switch method applicable between each of a plurality of standby combination candidates and each of the plurality of active combinations from the plurality of switch methods;

determining the priority of the selected switch method of each of the plurality of standby combination candidates by referring to the priority information;

evaluating each of the plurality of standby combination candidates based on the determined priority of the selected switch method of each of the plurality of standby combination candidates, wherein the plurality of standby combination candidates include an empty position where the computer is not physically present in a chassis.

2. The management method for a computer system according to claim 1, wherein the plurality of standby combination candidates include a position where the computer is already physically present in the chassis.

3. The management method for a computer system according to claim 1, wherein the management system selects a recommended combination from the standby combination candidates satisfying a user request by referring to user request information indicating the user request for the evaluation of the standby combination candidates.

4. The management method for a computer system according to claim 1, wherein the management system displays information indicating the evaluation of the standby combination candidate on a display apparatus.

5. The management method for a computer system according to claim 1 further comprising the steps of:

selecting a recommended combination from the plurality of standby combination candidates based on the evaluation of each of the plurality of standby combination candidates; and displaying the recommended combination on a display apparatus.

6. A computer system, comprising:

a plurality of computers;

a plurality of I/O adapters for connecting the plurality of computers to a network; and a management system, wherein includes priority information associating each of a plurality of switch methods of the computers and a priority, wherein the management system includes a processor coupled to a memory storing instructions that when executed by the processor causes the processor to:

determine a standby combination candidate of an arrangement position candidate of a standby computer and an arrangement position candidate of a standby I/O adapter, determine a plurality of active combinations of an arrangement position of an active computer and an arrangement position of an active I/O adapter, select a switch method applicable between the standby combination candidate and each of the plurality of active combinations from the plurality of switch methods, determine the priority of the selected switch method by referring to the priority information, evaluate the standby combination candidate based on the determined priority of the selected switch method, select the switch method applicable between each of a plurality of standby combination candidates and each of the plurality of active combinations from the plurality of switch methods, determine the priority of the selected switch method of each of the plurality of standby combination candidates by referring to the priority information, and evaluate each of the plurality of standby combination candidates based on the determined priority of the selected switch method of each of the plurality of standby combination candidates, wherein the plurality of standby combination candidates include an empty position where the computer is not physically present in a chassis.

7. The computer system according to claim 6, wherein the management system further includes a display apparatus for displaying information indicating the evaluation of the combination candidate.

8. The computer system according to claim 6, wherein the plurality of standby combination candidates include a position where the computer is already physically present in the chassis.

9. A non-transitory computer-readable storage medium including a program code, the program code causing a management system to execute a management method for a computer system including a plurality of computers and a plurality of I/O adapters, the management method comprising:

selecting a standby combination candidate of an arrangement position candidate of a standby computer and an arrangement position candidate of a standby I/O adapter;

specifying a plurality of active combinations of an arrangement position of an active computer and an arrangement position of an active I/O adapter;

selecting a switch method applicable between the standby combination candidate and each of the plurality of active combinations from a plurality of switch methods;

determining a priority of the selected switch method by referring to priority information associating each of the plurality of switch methods and the priority;

evaluating the standby combination candidate based on the determined priority of the selected switch method;

selecting the switch method applicable between each of a plurality of standby combination candidates and each of the plurality of active combinations from the plurality of switch methods;

the management system determines the priority of the selected switch method of each of the plurality of standby combination candidates by referring to the priority information;

the management system evaluates each of the plurality of standby combination candidates based on the determined priority of the selected switch method of each of the plurality of standby combination candidates, wherein the plurality of standby combination candidates include an empty position where the computer is not physically present in a chassis.

* * * * *